(12) United States Patent
Anderson et al.

(10) Patent No.: US 11,169,993 B2
(45) Date of Patent: Nov. 9, 2021

(54) DATASTORE MECHANISM FOR MANAGING OUT-OF-MEMORY DATA

(71) Applicant: The MathWorks, Inc., Natick, MA (US)

(72) Inventors: Penelope Anderson, Newton, MA (US); Richard Amos, St. Ives (GB); Yashwanth Annapureddy, Waltham, MA (US); Nicholas Haddad, Wayland, MA (US); Aaditya Kalsi, Natick, MA (US); Thomas Lane, Carlisle, MA (US); Jocelyn Martin, Burwell (GB); Michael Procopio, Sudbury, MA (US); Anandan Rangasamy, Natick, MA (US); James Stewart, Newton, MA (US); Wei Wang, Watertown, MA (US); Kari Sortland, Natick, MA (US)

(73) Assignee: The MathWorks, Inc., Natick, MA (US)

(*) Notice: Subject to any disclaimer, the term of this patent is extended or adjusted under 35 U.S.C. 154(b) by 277 days.

(21) Appl. No.: 14/458,895

(22) Filed: Aug. 13, 2014

(65) Prior Publication Data

US 2015/0356138 A1 Dec. 10, 2015

Related U.S. Application Data

(60) Provisional application No. 62/008,943, filed on Jun. 6, 2014.

(51) Int. Cl.
*G06F 16/00* (2019.01)
*G06F 16/2453* (2019.01)
(Continued)

(52) U.S. Cl.
CPC ...... *G06F 16/24532* (2019.01); *G06F 9/5066* (2013.01); *G06F 16/2219* (2019.01); *G06F 16/2471* (2019.01)

(58) Field of Classification Search
CPC ......... G06F 17/30569; G06F 17/30864; G06F 17/30445; G06F 17/30318;
(Continued)

(56) References Cited

U.S. PATENT DOCUMENTS 7,650,331 B1   1/2010 Dean et al.
9,355,145 B2 * 5/2016 George ............. G06F 17/30448
(Continued)

OTHER PUBLICATIONS

Apache Hadoop, as downloaded on Apr. 23, 2014 from http://en.wikipedia.org/wiki/Hadoop.
(Continued)

*Primary Examiner* — Vincent F Boccio
(74) *Attorney, Agent, or Firm* — Wolf, Greenfield & Sacks, P.C.

(57) ABSTRACT

According to some embodiments, a method for making input data available for processing by one or more processors comprises storing one or more parameters, wherein the one or more parameters comprise information identifying a location of the input data; and creating a datastore object using the one or more parameters, wherein the datastore object interfaces the input data and includes a read method for reading a chunk, the chunk being a subset of the input data, and having a size that does not exceed a memory size assigned to the one or more processors. According to some embodiments, the one or more parameters further comprise one or more of a type of the input data; a format of the input data; an offset for reading from the input data; a size of the chunk; a condition for determining the chunk; and a query for deriving the input data.

21 Claims, 20 Drawing Sheets

(51) Int. Cl.
*G06F 16/22* (2019.01)
*G06F 16/2458* (2019.01)
*G06F 9/50* (2006.01)

(58) Field of Classification Search
CPC ........... G06F 17/30545; G06F 16/2219; G06F 16/24532; G06F 16/2471; G06F 16/2428; G06F 16/254; G06F 16/951; G06F 16/24568; G06F 9/5066
USPC ........................................................ 707/737
See application file for complete search history.

(56) References Cited

U.S. PATENT DOCUMENTS

| | | | |
|---|---|---|---|
| 9,996,597 B2 | 6/2018 | Anderson et al. | |
| 2007/0239663 A1 | 10/2007 | Dyskant | |
| 2008/0086442 A1* | 4/2008 | Dasdan | G06F 17/30584 |
| 2008/0120314 A1* | 5/2008 | Yang | G06F 17/30498 |
| 2009/0193220 A1* | 7/2009 | Nonogaki | G06F 12/023 |
| | | | 711/171 |
| 2010/0257198 A1 | 10/2010 | Cohen et al. | |
| 2011/0246472 A1* | 10/2011 | Dillon | G06F 17/30864 |
| | | | 707/741 |
| 2011/0313973 A1* | 12/2011 | Srivas | G06F 17/30194 |
| | | | 707/634 |
| 2014/0032527 A1* | 1/2014 | Chambers | G06F 9/3885 |
| | | | 707/717 |
| 2014/0032528 A1* | 1/2014 | Mandre | G06F 17/30463 |
| | | | 707/718 |
| 2014/0101092 A1* | 4/2014 | Simitsis | G06F 9/451 |
| | | | 707/602 |
| 2014/0123115 A1* | 5/2014 | Peretz | G06F 11/362 |
| | | | 717/127 |
| 2014/0136779 A1 | 5/2014 | Guha et al. | |
| 2014/0181238 A1* | 6/2014 | Sumrail | G06F 21/00 |
| | | | 709/216 |
| 2014/0215178 A1* | 7/2014 | Li | G06F 9/5066 |
| | | | 711/173 |
| 2014/0351233 A1* | 11/2014 | Crupi | G06F 16/24568 |
| | | | 707/706 |
| 2014/0380489 A1* | 12/2014 | Hacid | G06F 21/6254 |
| | | | 726/26 |
| 2015/0074151 A1* | 3/2015 | Chaiken | G06F 17/30569 |
| | | | 707/803 |
| 2015/0100555 A1* | 4/2015 | Tremblay | G06F 17/3007 |
| | | | 707/693 |
| 2015/0150017 A1* | 5/2015 | Hu | G06F 12/00 |
| | | | 718/103 |
| 2015/0205633 A1* | 7/2015 | Kaptur | G06F 9/4881 |
| | | | 718/102 |
| 2015/0356157 A1 | 12/2015 | Anderson et al. | |
| 2016/0221592 A1* | 8/2016 | Puttagunta | B61L 23/34 |
| 2020/0257716 A1* | 8/2020 | Bhave | G06F 16/24522 |

OTHER PUBLICATIONS

MapReduce, as downloaded on Apr. 23, 2014 from http://en.wikipedia.org/wiki/Mapreduce.

Li B., et al., "A Platform for Scalable One-Pass Analytics using MapReduce," University of Massachusetts, Amherst, MA, (2011), pp. 985-996.

Anonymous, "Hadoop Performance Tuning," Impetus Technologies, www.impetus.com, Nov. 16, 2010, pp. 1-13.

Extended European Search Report for European Application No. 15170801.3, dated Dec. 10, 2015.

Extended European Search Report for European Application No. 15170806.2, dated Dec. 22, 2015.

Drozdowski et al., Out-of-core divisible load processing. IEEE Transactions on Parallel and Distributed Systems. Oct. 2003. 27; 14(10): 1048-56.

Plimpton et al., MapReduce in MPI for large-scale graph algorithms. Parallel Computing. Sep. 1, 2011;37(9):610-32.

Polo et al., Performance Management of Accelerated MapReduce Workloads in Heterogeneous Clusters. 39th International Conference on Parallel Processing. Sep. 13, 2010; 653-62.

Rafique et al., Supporting MapReduce on large-scale asymmetric multi-core clusters. ACM SIGOPS Operating Systems Review. Apr. 21, 2009; 43(2): 25-34.

Wang et al., SciMATE: A Novel MapReduce-Like Framework for Multiple Scientific Data Formats. Proceedings of the 12th IEEE/ACM International Symposium on Cluster, Cloud and Grid Computing. May 13, 2012; 443-50.

EP15170801.3, dated Dec. 10, 2015, Extended European Search Report.

EP15170806.2, dated Dec. 22, 2015, Extended European Search Report.

* cited by examiner

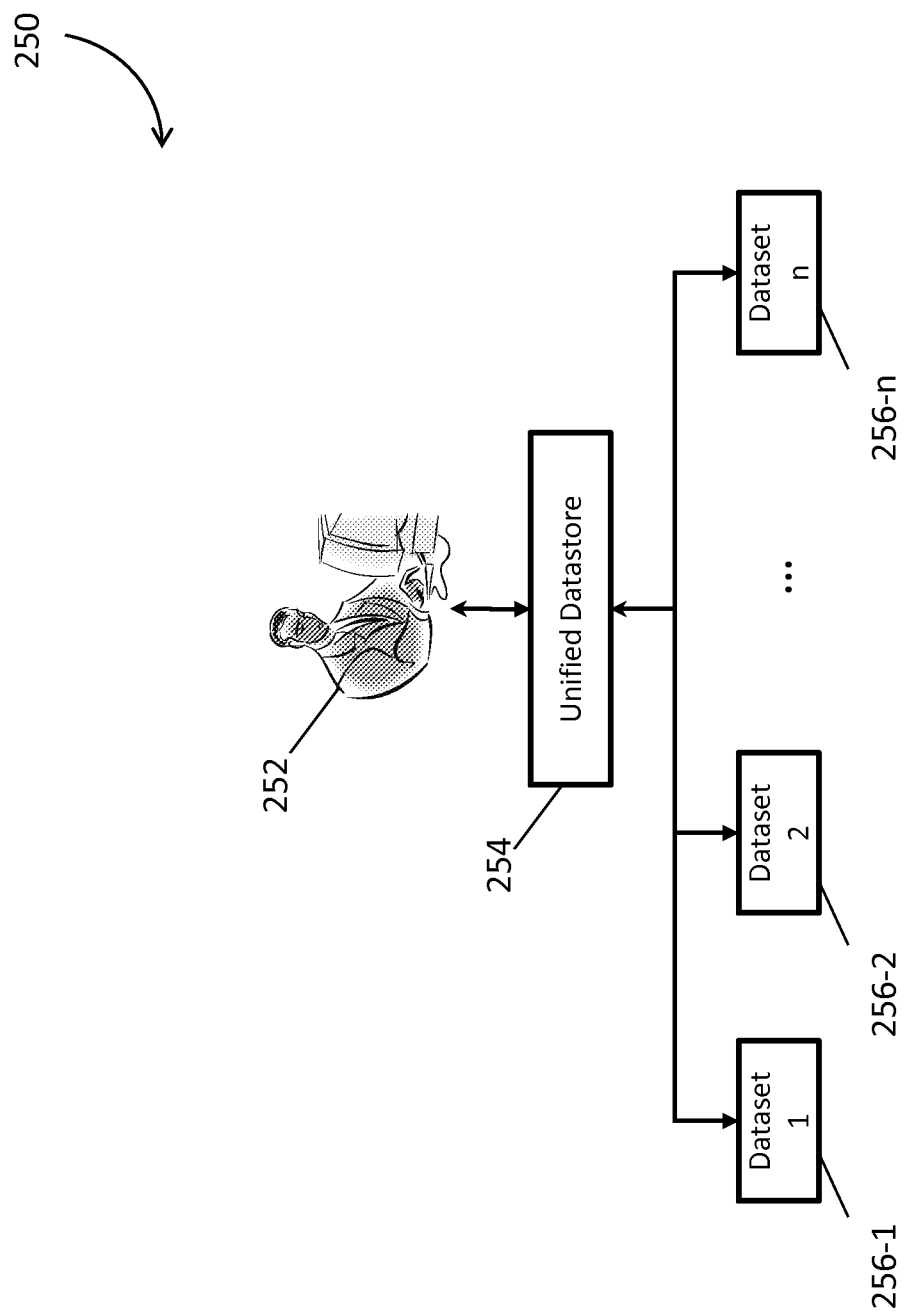

700

Year,Month,DayofMonth,DayOfWeek,DepTime,CRSDepTime,ArrTime,CRSArrTime,UniqueCarrier,FlightNum,TailNum,ActualElapsedTime,CRSElapsedTime,AirTime,ArrDelay,DepDelay,Origin,Dest,Distance,TaxiIn,TaxiOut,Cancelled,CancellationCode,Diverted,CarrierDelay,WeatherDelay,NASDelay,SecurityDelay,LateAircraftDelay
1987,10,14,3,741,730,912,849,PS,1451,NA,91,79,NA,23,11,SAN,SFO,447,NA,NA,0,NA,0,NA,NA,NA,NA,NA
1987,10,15,4,729,730,903,849,PS,1451,NA,94,79,NA,14,-1,SAN,SFO,447,NA,NA,0,NA,0,NA,NA,NA,NA,NA
1987,10,17,6,741,730,918,849,PS,1451,NA,97,79,NA,29,11,SAN,SFO,447,NA,NA,0,NA,0,NA,NA,NA,NA,NA
1987,10,18,7,729,730,847,849,PS,1451,NA,78,79,NA,-2,-1,SAN,SFO,447,NA,NA,0,NA,0,NA,NA,NA,NA,NA
1987,10,19,1,749,730,922,849,PS,1451,NA,93,79,NA,33,19,SAN,SFO,447,NA,NA,0,NA,0,NA,NA,NA,NA,NA
1987,10,21,3,728,730,848,849,PS,1451,NA,80,79,NA,-1,-2,SAN,SFO,447,NA,NA,0,NA,0,NA,NA,NA,NA,NA
1987,10,22,4,728,730,852,849,PS,1451,NA,84,79,NA,3,-2,SAN,SFO,447,NA,NA,0,NA,0,NA,NA,NA,NA,NA
1987,10,23,5,731,730,902,849,PS,1451,NA,91,79,NA,13,1,SAN,SFO,447,NA,NA,0,NA,0,NA,NA,NA,NA,NA
: : :

Fig. 7A

710 ds =
TabularTextDataStore with properties:

Files: {
        'S:\bigdata\datasets\airline\1987.csv',
        'S:\bigdata\datasets\airline\1988.csv',
        'S:\bigdata\datasets\airline\1989.csv',
        ... and 19 more
    }
    ReadVariableNames: true
    VariableNames: {'Year','Month','DayofMonth' ... and 26 more}
         Formats: {'%f','%f','%f' ... and 26 more}
Text Format Properties:
         NumHeaderLines: 0
              Delimiter: ',',
            RowDelimiter: '\r\n'
           TreatAsMissing: 'NA'
            MissingValue: NaN
Advanced Text Format Properties:
        ExponentCharacters: 'eEdD'
             CommentStyle: ''
               Whitespace: ' \b\t'
Properties to control the table returned by preview, read and readall:
        ActiveVariableNames: {'Year','Month','DayofMonth' ... and 26 more}
            ActiveFormats: {'%f','%f','%f' ... and 26 more}
              RowsPerRead: 20000

| Year | Month | DayofMonth | DayOfWeek | DepTime | CRSDepTime | ArrTime |
|---|---|---|---|---|---|---|
| 1987 | 10 | 14 | 3 | 741 | 730 | 912 |
| 1987 | 10 | 15 | 4 | 729 | 730 | 903 |
| 1987 | 10 | 17 | 6 | 741 | 730 | 918 |
| 1987 | 10 | 18 | 7 | 729 | 730 | 847 |
| 1987 | 10 | 19 | 1 | 749 | 730 | 922 |
| 1987 | 10 | 21 | 3 | 728 | 730 | 848 |
| 1987 | 10 | 22 | 4 | 728 | 730 | 852 |
| 1987 | 10 | 23 | 5 | 731 | 730 | 902 |

| CRSArrTime | UniqueCarrier | FlightNum | TailNum | ActualElapsedTime |
|---|---|---|---|---|
| 849 | 'PS' | 1451 | NaN | 91 |
| 849 | 'PS' | 1451 | NaN | 94 |
| 849 | 'PS' | 1451 | NaN | 97 |
| 849 | 'PS' | 1451 | NaN | 78 |
| 849 | 'PS' | 1451 | NaN | 93 |
| 849 | 'PS' | 1451 | NaN | 80 |
| 849 | 'PS' | 1451 | NaN | 84 |
| 849 | 'PS' | 1451 | NaN | 91 |

| CRSElapsedTime | AirTime | ArrDelay | DepDelay | Origin | Dest | Distance |
|---|---|---|---|---|---|---|
| 79 | NaN | 23 | 11 | 'SAN' | 'SFO' | 447 |
| 79 | NaN | 14 | -1 | 'SAN' | 'SFO' | 447 |
| 79 | NaN | 29 | 11 | 'SAN' | 'SFO' | 447 |
| 79 | NaN | -2 | -1 | 'SAN' | 'SFO' | 447 |
| 79 | NaN | 33 | 19 | 'SAN' | 'SFO' | 447 |
| 79 | NaN | -1 | -2 | 'SAN' | 'SFO' | 447 |
| 79 | NaN | 3 | -2 | 'SAN' | 'SFO' | 447 |
| 79 | NaN | 13 | 1 | 'SAN' | 'SFO' | 447 |

| TaxiIn | TaxiOut | Cancelled | CancellationCode | Diverted | CarrierDelay |
|---|---|---|---|---|---|
| NaN | NaN | 0 | NaN | 0 | NaN |
| NaN | NaN | 0 | NaN | 0 | NaN |
| NaN | NaN | 0 | NaN | 0 | NaN |
| NaN | NaN | 0 | NaN | 0 | NaN |
| NaN | NaN | 0 | NaN | 0 | NaN |
| NaN | NaN | 0 | NaN | 0 | NaN |
| NaN | NaN | 0 | NaN | 0 | NaN |
| NaN | NaN | 0 | NaN | 0 | NaN |

| WeatherDelay | NASDelay | SecurityDelay | LateAircraftDelay |
|---|---|---|---|
| NaN | NaN | NaN | NaN |
| NaN | NaN | NaN | NaN |
| NaN | NaN | NaN | NaN |
| NaN | NaN | NaN | NaN |
| NaN | NaN | NaN | NaN |
| NaN | NaN | NaN | NaN |
| NaN | NaN | NaN | NaN |
| NaN | NaN | NaN | NaN |

```
ds =
TabularTextDataStore with properties:
                    Files: {
                            'S:\bigdata\datasets\airline\1987.csv',
                            'S:\bigdata\datasets\airline\1988.csv',
                            'S:\bigdata\datasets\airline\1989.csv',
                            ... and 19 more
                           }
         ReadVariableNames: true
             VariableNames: {'Year','Month','DayofMonth' ... and 26 more}
                  Formats: {'%*f','%*f','%*f' ... and 26 more}
Text Format Properties:
            NumHeaderLines: 0
                 Delimiter: ','
              RowDelimiter: '\r\n'
            TreatAsMissing: 'NA'
              MissingValue: NaN
Advanced Text Format Properties:
        ExponentCharacters: 'eEdD'
              CommentStyle: ''
                Whitespace: ' \b\t'
Properties to control the table returned by preview, read and readall:
        ActiveVariableNames: {'ArrDelay'}
              ActiveFormats: {'%f'}
                RowsPerRead: 20000
```

Fig. 7D

810 ds =
ImageDataStore with properties:

Files: {
    '/sandbox/bigdata/datasets/image_file_folder/1.jpg',
    '/sandbox/bigdata/datasets/image_file_folder/2.jpg',
    '/sandbox/bigdata/datasets/image_file_folder/3.jpg'
    ... and 142 more
  }

DatabaseDatastore with properties:

Connection: [1x1 database]
Cursor: [1x1 cursor]
Query: 'Select All unitCost FROM largedata'

Fig. 9A

920 tab8 =

| unitCost |
|---|
| 14 |
| 9 |
| 17 |
| 21 |
| 3 |
| 8 |
| 16 |
| 5 |

| | A | B | C | D | E | F | G | H | I | J | K | L | M | N | O | P | Q | R | S | T |
|---|---|---|---|---|---|---|---|---|---|---|---|---|---|---|---|---|---|---|---|---|
| | Year | Month | DayofMon | DayOfWeek | DepTime | CRSDepTime | ArrTime | CRSArrTime | UniqueCar | FlightNum | TailNum | ActualElap | CRSElapse | AirTime | ArrDelay | DepDelay | Origin | Dest | Distance | Taxi |
| 2 | 1987 | 10 | | 1 | | | 1865 | 41 | 1900 CO | | 974 NA | 38 | 35 NA | | 321 | 318 SFO | GJM | 129 NA | |
| 3 | 1987 | 10 | | 1 | | | 5 | 38 | 49 OH | | 353 NA | 35 | 36 NA | | ? | ? MCO | BBB | 142 NA | |
| 4 | 1987 | 10 | | 1 | | | 2339 | 728 | 712 US | | 662 NA | 265 | 253 NA | | 16 | 4 LAX | PIT | 2136 NA | |
| 5 | 1987 | 10 | | 1 | | | 9 | 657 | 649 NA | | 649 NA | 343 | 340 NA | | ? | ? SMF | ORD | 1781 NA | |

Fig. 10

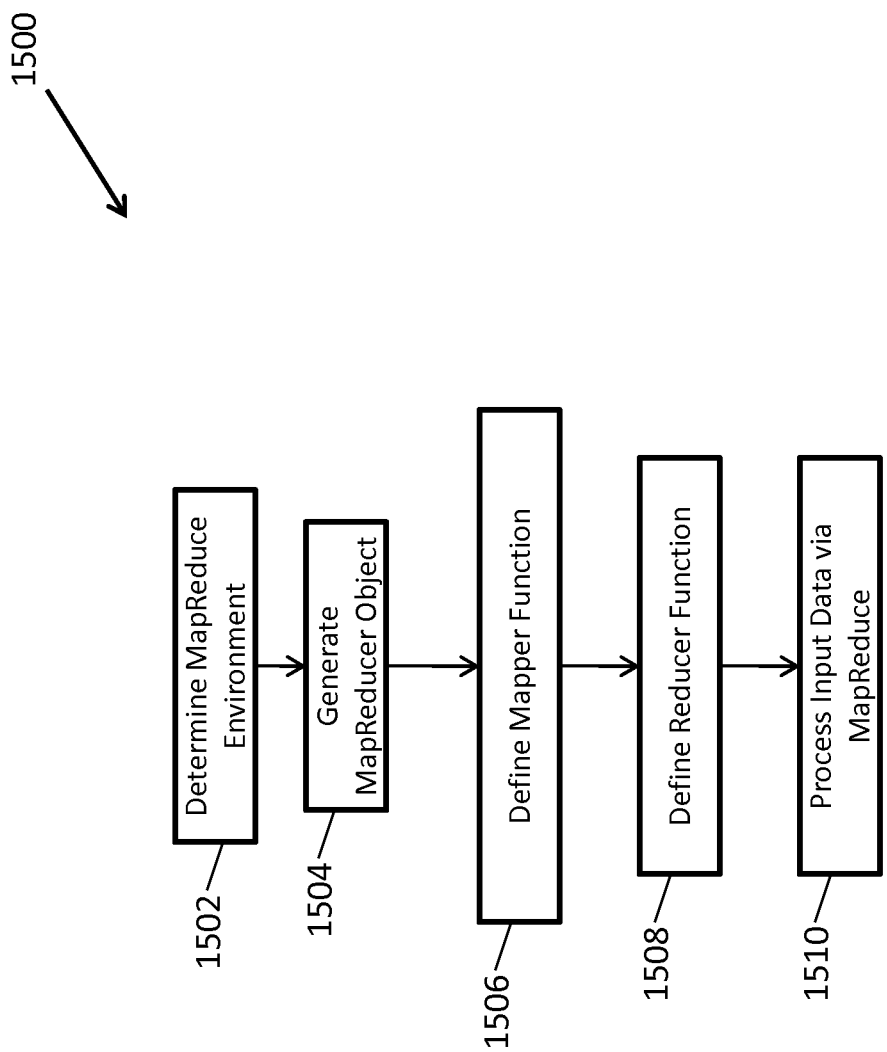

DATASTORE MECHANISM FOR MANAGING OUT-OF-MEMORY DATA

RELATED APPLICATION(S)

This application claims priority to the US Provisional Patent Application No. 62/008,943, filed Jun. 6, 2014, and titled "Unified Mapreduce Framework for Large-Scale Data Processing," the entire contents of which are incorporated herein by reference.

TECHNICAL FIELD

The present disclosure relates generally to processing large amount of data and in particular to a mechanism for processing out-of-memory data in a parallel processing environment.

BACKGROUND

Acquiring and analyzing "big data" is an important part of today's scientific and technological progress. The term big data generally refers to any collection of data sets that is very large and complex, so that it cannot be captured or processed by traditional tools, such as common databases or common data processing techniques. Large-scale datasets may be collected from different sources, for instance, financial markets, internet interactions, mobile phone users, industrial productions, consumer behavior, and so on. Some large-scale datasets reach the sizes of many petabytes, a petabyte being $10^{15}$ bytes or a thousand terabytes. Collecting and analyzing these datasets is very challenging for today's computer technologies.

Some existing techniques attempt to manage big data. These techniques include using distributed file systems for storing large datasets or using multi-processing for analyzing those datasets. These techniques, however, cannot keep pace with the ever growing scale of the large datasets. Moreover, these techniques are often inaccessible to the common users, but instead are retained and available to institutional, corporate, or government users. In addition, existing technologies often require authorized users to have knowledge of the underlying storage and processing architecture and the related software packages.

SUMMARY

According to some embodiments, a method for processing input data comprises creating a MapReducer object, wherein the MapReducer object corresponds to a MapReduce environment, and the MapReduce environment is one of a plurality of MapReduce environments; and receiving, by a MapReduce interface, a plurality of input parameters comprising the input data; a mapper function; a reducer function; and the MapReducer object; and using the MapReduce interface to process the input data by one or more processors in the MapReduce environment using the mapper function and the reducer function.

According to some embodiments, the MapReduce environment is a first MapReduce environment; the MapReducer object is a first MapReducer object; and the method further comprises creating a second MapReducer object, wherein the second MapReducer object corresponds to a second MapReduce environment that is one of the plurality of MapReduce environments; receiving, by the MapReduce interface, the second MapReducer object in place of the first MapReducer object; and utilizing the MapReduce interface to process the input data by the one or more processors in the second MapReduce environment using the mapper function and the reducer function. According to some embodiments, the plurality of MapReduce environments includes two or more of a serial processing environment, a parallel processing environment, a parallel Hadoop environment, and a MATLAB deployment environment.

According to some embodiments, the MapReduce interface receives through an input data application programming interface one or more identifiers corresponding to one or more of the plurality of input parameters. According to some embodiments, the MapReduce interface receives default values for one or more of the MapReducer object, the input data, the mapper function, and the reducer function.

According to some embodiments, processing the input data in the MapReduce environment is one MapReduce operation in a plurality of chained MapReduce operations. According to some embodiments, the one or more processors have respective memory sizes and the input data is a dataset having a size that exceeds one or more of the memory sizes. According to some embodiments, the MapReduce interface delivers to the mapper function a subset of the input data, wherein the subset has a size that does not exceed one or more of the memory sizes. According to some embodiments, an input parameter corresponding to the input data includes a datastore interfacing the dataset.

According to some embodiments, the method further comprises dividing the input data into a plurality of chunks having sizes that do not exceed one or more of the memory sizes. According to some embodiments, the one or more processors have respective memory sizes, the method further comprising generating an intermediate data using the mapper function, wherein the intermediate data has a size that exceeds one or more of the memory sizes; storing the intermediate data in a storage; and processing the input data in the MapReduce environment using the intermediate data and the reducer function. According to some embodiments, the one or more processors have respective memory sizes, the method further comprising generating a reduce output using the reducer function, wherein the reduce output has a size that exceeds one or more of the memory sizes; and storing the reduce data output in a storage.

According to some embodiments, the input data is a first input data; the MapReduce environment is a first MapReduce environment; the MapReducer object is a first MapReducer object; and the method further comprises creating a second MapReducer object, wherein the second MapReducer object corresponds to a second MapReduce environment that is one of the plurality of MapReduce environments; receiving, by the MapReduce interface, second input data in place of the first input data, and the second MapReducer object in place of the first MapReducer object; and using the MapReduce interface to process the second input data by the one or more processors in the second MapReduce environment using the mapper function and the reducer function.

According to some embodiments, using the MapReduce interface to process the first input data in the first MapReduce environment is used to debug the mapper function or the reducer function before using the MapReduce interface to process the second input data in the second MapReduce environment. According to some embodiments, the method further comprises rendering the input data into chunks of data; and passing the chunks to the mapper function. According to some embodiments, the method further comprises rendering the input data into a plurality of tables; and passing a table to a mapper node configured to execute the mapper function. According to some embodiments, one or more of the mapper function and the reducer function are configured to receive data in a plurality of sizes. According to some embodiments, processing the input data results in a datastore object.

According to some embodiments, a non-transitory computer-readable medium stores a computer code, wherein the computer code, when executed by one or more processors, causes the one or more processors to perform the method for processing input data.

According to some embodiments, a system for processing input data comprises one or more processors configured to create a MapReducer object, wherein the MapReducer object corresponds to a MapReduce environment, and the MapReduce environment is one of a plurality of MapReduce environments; and receive, by a MapReduce interface, a plurality of input parameters comprising the input data; a mapper function; a reducer function; and the MapReducer object; and use the MapReduce interface to process the input data in the MapReduce environment using the mapper function and the reducer function.

According to some embodiments, a method for making input data available for processing by one or more processors comprises storing one or more parameters, wherein the one or more parameters comprise information identifying a location of the input data; and creating a datastore object using the one or more parameters, wherein the datastore object interfaces the input data, and the datastore object includes a read method for reading a chunk, the chunk being a subset of the input data, and having a size that does not exceed a memory size assigned to the one or more processors.

According to some embodiments, the one or more parameters further comprise one or more of a type of the input data; a format of the input data; an offset for reading from the input data; a size of the chunk; a condition for determining the chunk; and a query for deriving the input data. According to some embodiments, the one or more parameters further comprise one or more additional parameters derived from the location of the input data, the one or more additional parameters comprising one or more of a type of the input data; and a format of the input data. According to some embodiments, the method further comprises setting the size of the chunk. According to some embodiments, the size of the chunk is set based on one or more memory sizes. According to some embodiments, the one or more memory sizes are assigned to the one or more processors. According to some embodiments, the datastore object further includes one or more of a reset method for resetting a state of the datastore object to an initial state where no data is read; a preview method for reading a preview subset of the input data; a hasdata method for determining whether all of the input data has been read; and a write data method to receive an additional data; and add the additional data to the input data.

According to some embodiments, the input data has a type of a plurality of data types, and a type of the datastore object is determined based on the type. According to some embodiments, the plurality of data types include one or more of a tabular text file; an SQL file; an image file; and a key-value pair formatted file. According to some embodiments, the input data includes a plurality of files. According to some embodiments, the information identifying the location of the input data includes an address of the plurality of files. According to some embodiments, the datastore object further includes a split method for splitting the input data into a plurality of split sections. According to some embodiments, the datastore object distributes the plurality of split sections among a plurality of multi-processing nodes.

According to some embodiments, the datastore object is used as an input to a MapReduce interface for processing the input data. According to some embodiments, the datastore object is generated through a MapReduce system. According to some embodiments, the size of the chunk is set based on a type of the input data. According to some embodiments, the input data is stored in a storage environment and a type of the datastore object is determined based on the storage environment.

According to some embodiments, a non-transitory computer-readable medium stores a computer code, wherein the computer code, when executed by one or more processors, causes the one or more processors to perform the method for making input data available for processing by the one or more processors.

According to some embodiments, a system for processing input data comprises one or more processors configured to store one or more parameters, wherein the one or more parameters comprise information identifying a location of the input data; and create a datastore object using the one or more parameters, wherein the datastore object interfaces the input data, and the datastore object includes a read method for reading a chunk, the chunk being a subset of the input data, and having a size that does not exceed a memory size assigned to the one or more processors.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in this specification and constitute a part of it, illustrate several embodiments consistent with the disclosure. Together with the description, the drawings serve to explain the principles of the disclosure.

In the drawings:

FIG. 2B shows a high level schematic for a unified datastore according to some embodiments.

FIGS. 7A-7D show different views related to a tabular text file and a tabular text datastore object according to one embodiment.

FIG. 8 shows a summary view of an image type datastore object according to one embodiment.

FIGS. 9A and 9B show different views related to a database type datastore object according to one embodiment.

FIG. 10 shows an illustrative set of input data according to an embodiment.

FIG. 15 shows a flowchart for processing some input data through one or more MapReduce environments according to some embodiments.

DETAILED DESCRIPTION

Figure 1:
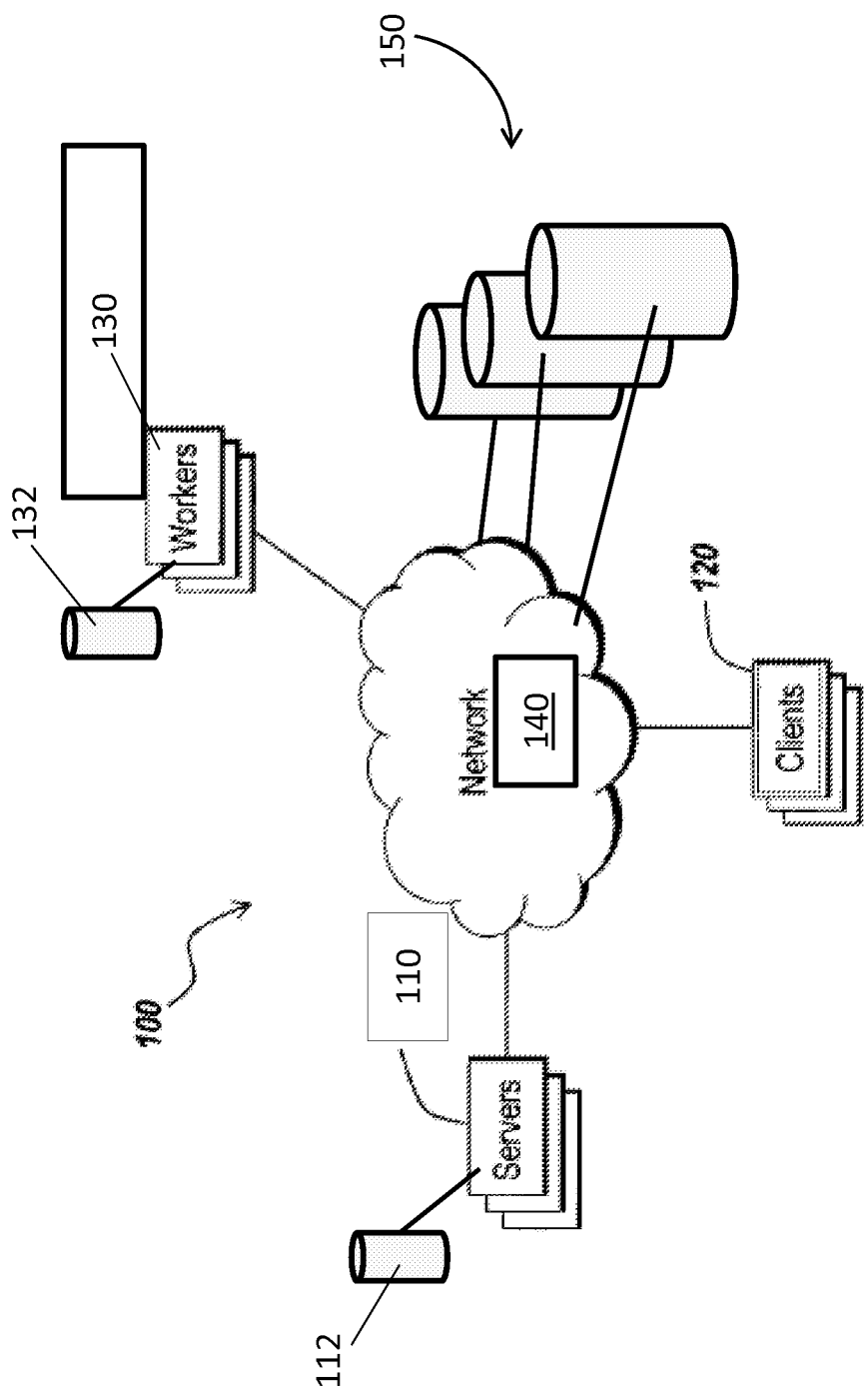
FIG. 1 shows an exemplary illustration of a distributed storage and processing environment according to some embodiments.

The following detailed description refers to the accompanying drawings. Wherever possible, the same or similar reference numbers are used in the drawings or in the description to refer to the same or similar parts. Also, similarly-named elements may perform similar functions and may be similarly designed, unless specified otherwise. Numerous details are set forth to provide an understanding of the described embodiments. The embodiments may be practiced without these details. In other instances, well-known methods, procedures, and components have not been described in detail to avoid obscuring the described embodiments.

While several exemplary embodiments and features are described here, modifications, adaptations, and other implementations may be possible, without departing from the spirit and scope of the embodiments. Accordingly, unless explicitly stated otherwise, the descriptions relate to one or more embodiments and should not be construed to limit the embodiments as a whole. This is true regardless of whether or not the disclosure states that a feature is related to "a," "the," "one," "one or more," "some," or "various" embodiments. Instead, the proper scope of the embodiments is defined by the appended claims.

In this disclosure, the terms "include," "comprise," "contain," and "have," when used after a set or a system, mean an open inclusion and do not exclude addition of other, non-enumerated, members to the set or to the system. Moreover, as used in this disclosure, a subset of a set can include one or more than one, including all, members of the set.

Various embodiments enable storage and computing technologies to store and process big data. Storing large-scale datasets requires large capacity storage devices. Different embodiments utilize different techniques to store such data sets; techniques such as collection of storage units, distributed storage systems, clustered file systems, or parallel file systems. These storage systems may use different types of environments to store the data, distribute them among different storage units, and present the data to a user. These environments may include network file systems and Hadoop® distributed files systems. Moreover, a user may utilize a distributed processing environment, such as multi-processing, to process large scale data. Processing data may include analyzing or modifying data.

FIG. 1 shows an exemplary illustration of a distributed storage and processing environment 100 according to some embodiments. Environment 100 may include one or more servers 110, one or more clients 120, one or more workers 130, and one or more communication networks 140. Further, environment 100 may include one or more network attached storage systems 150. Servers 110 and workers 130 may also have some storage associated to them, shown respectively as storages 112 and 132. In some embodiments, servers 110, clients 120, and workers 130 are implemented via one or more computer systems. Further, storage systems 150 may store data and make them accessible via one or more storage environments. A storage environment may include one or more networked storage devices such as magnetic or optical disks, or solid state memories. Storage devices within an environment may be arranged as arrays of storage devices, redundant storage devices, and so on. Examples of storage environments further include Network File System (NFS) or Hadoop Distributed File System (HDFS).

Servers 110 and workers 130 may collaborate to process data via single or multi-processing methods, and deliver the results to clients 120. Moreover, servers 110 and workers 130 may utilize their associated storages 112 and 132, or a network attached storage 140 to store data inputs, intermediate data used during the processing, and output data resulting from the processing. In some embodiments, environment 100 uses the Distributed computing with MATLAB® for processing data. In some embodiments of environment 100, servers 110, clients 120, and worker 130 execute at least a portion of software packages that enable Distributed computing with MATLAB Distributed Computing Server. In some embodiments, servers and workers are called nodes. These nodes may be further named after the type of function they perform, as further discussed below.

Figure 2A:
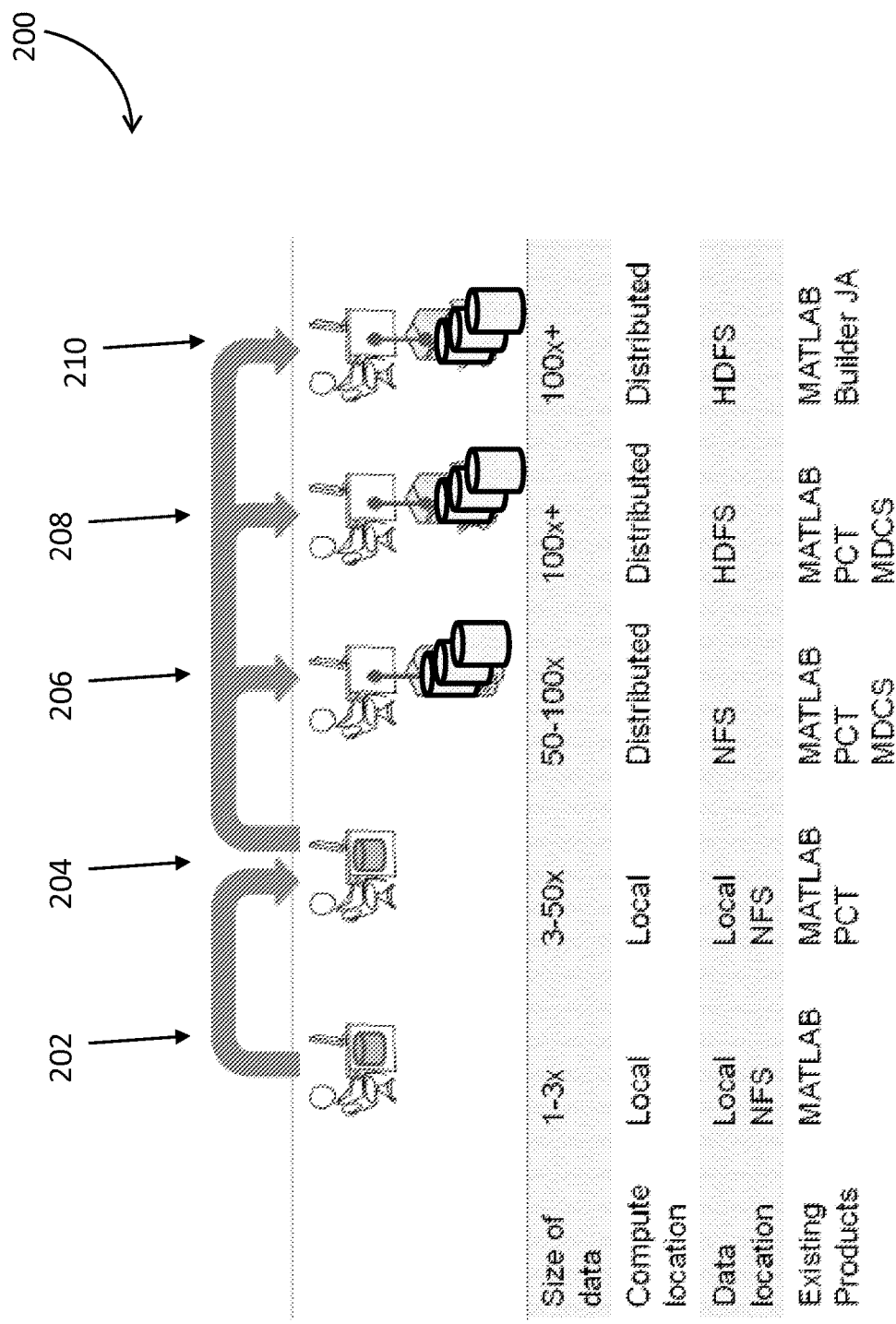
FIG. 2A shows a schematic of different users processing varying sizes of data in different environments according to some embodiments.

The users adapt to the growing size of their datasets by using larger storage systems or more complicated storage and processing environments. FIG. 2A shows a schematic 200 of different users processing varying sizes of data in different environments according to some embodiments. In particular, sections 202 and 204 shows that for small size data, such as data that can be processed on the machine's local memory, a user may store the data in local file systems such as local disk. The user may further process the data on a local processor using applications such as MATLAB. Sections 206, 208, and 210, on the other hand, show that as the size of the data grows, however, a user may store it in more suitable file systems such as NFS or Hadoop's HDFS. Moreover, to gain a better performance, the user may use distributed computing systems, such as parallel processing.

As the users move to more powerful storage or processing environments, they encounter many challenges. The different storage systems may utilize different storage management environments, requiring a variety of accessing techniques. Further, some processors may not have sufficient resources for processing the data allocated to them. Processing the data requires loading the data to the processor's allocated random access memory or similar type of memory. This memory, however, may not suffice for storing or processing the data allocated to the processor. Users, therefore, benefit from unified methods for managing data stored under disparate management environments. Further, users benefit from methods for providing the data to the processors in sizes that do not exceed the processor's resources such as a size of one or more memories assigned to the processor. In various embodiments, one or more memories assigned to a processor may include a local memory that is part of the machine that includes the processor, or a remote memory, which the processor accesses through the network. Further, these memories may include different types of data storage devices, such as a part or all of a cache, a random access memory (RAM), a read only memory (ROM), a hard disk, an optical disk, or other types of storages. Moreover, one or more memory sections may be assigned to a processor statically, such as during manufacture or set up, or assigned to the processor dynamically, such as during operation of the processor.

Various embodiments utilize a datastore, which provides such features, i.e., unified methods for managing data or providing them in a correct size. FIG. 2B shows a high level schematic 250 for a unified datastore according to some embodiments. Schematic 250 shows a user 252 who interacts what multiple datasets 256 through a unified datastore 254. In some embodiments, one or more computer programs employ the datastore for managing an out-of-memory set of data. Datasets 256 may reside in a collection of files, in a relational database, or in some other storage format where it resides, out of the main memory allocated to the one or more computer programs. Unified datastore 254 may provide an API for specifying the location and type of the datasets. The unified datastore locates the datasets and interfaces the data in the datasets. Interfacing the data includes providing a unified interface for an application to interact with the data through different methods. In particular, when interfacing a dataset, a datastore provides methods for dividing the data into chunks and reading in those chunks into the program's memory. In some embodiments, the one or more computer programs include a MATLAB program.

A datastore may be able to interface data that is in any one of a variety of formats or stored in any one of a variety of environments. Unified datastore 254 may enable the user to deal with such a variety without the need to learn or apply some specifics of the environments. In various embodiments, a datastore can interface with data that include a collection of tabular text files, data resulting from SQL queries, or data contained in Hadoop's HDFS file systems. The data may also be in a name-value format, often used by the MapReduce framework. Further, datastore provides systems for reading and previewing data, including data stored under HDFS. A datastore may support common file formats, such as text files, or sequence files.

Figure 3:
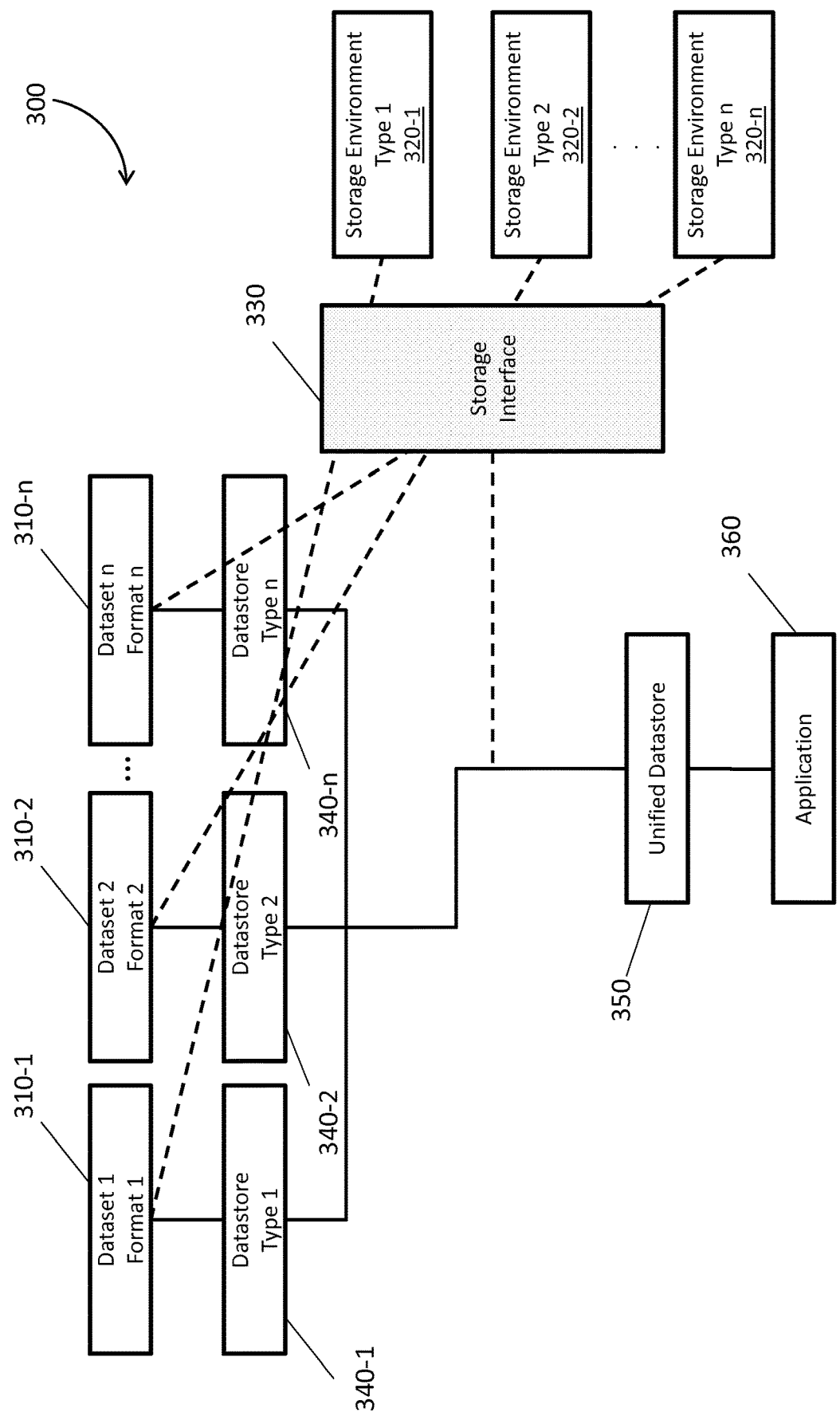
FIG. 3 is a diagram showing a schematic of a unified datastore interface for various datastores according to some embodiments.

FIG. 3 is a diagram 300 showing a schematic of a unified datastore interface for various storage environments according to some embodiments. Diagram 300 includes multiple datasets 310 (shows as 310-1, 310-2, ..., 310-*n*) that may have different formats and stored in different storage environments 320 (shown as 320-1 . . . 320-*n*). FIG. 3 further includes a storage interface 330, multiple datastore objects 340 (shown as 340-1 . . . 340-*n*), a unified datastore interface 350, and an application 360**.

Datasets 310 include the data to be interfaced by the datastore. These datasets may be in one or more of different formats, such as formatted text file, SQL table, Excel spread sheet, raw text, image format, etc. Moreover, these datasets may be stored in one or more of different storage environments 320. These environments may include databases, local files, shared file systems, distributed file systems, HDFS, etc. In some embodiments, the datastore provides a storage interface 330 for the datasets to be stored in one or more of storage environments 320. Storage interface 330 may be a virtual file system interface.

For a dataset 310, the datastore may create a datastore object 340, which is adapted to the format of that dataset. Therefore, as shown in diagram 300, the datastore object may have a type that corresponds to the format of the dataset. A datastore object 340 includes methods adapted for the corresponding format. These methods may enable for that format actions such as reading data, extracting data, writing data, or viewing data.

The datastore further includes a unified datastore interface 350. Interface 350 interacts with a dataset 310 through the corresponding datastore object 340. On the other hand, unified datastore interface 350 presents a unified interface to application 360. Through this unified interface, application 360 can receive and process datasets that are stored in different datasets 310. In doing so, application 360 may use a single syntax irrespective of the environment in which the data is stored. Application 360 may be a computer program (e.g., a script, a software application, etc). Further, Application 360 may be executed by one or more processors, such as those in a server, a worker, or a client. In some embodiments, Application 340 is a program implemented in MATLAB programming environment.

In some embodiments, a unified datastore can work both in a single-processor and a multi-processor environment; or can use both serial processing and parallel processing methods. A user may use datastore in a local environment to serially process data. A user may do so to prototype or debug an application or a program while processing a small amount of data, that is, data that fits into the memory of the local environment. The user may then use the datastore to deploy the application or the program in a multi-processor environment that may operate with a large amount of data, e.g., data stored on multiple NFSs.

In various embodiments, a datastore provides different features for handling the data with which the datastore interfaces. A datastore may, for example, provide methods for reading the data, previewing the data, or adding to the data.

In some embodiments, a datastore can interface with multiple files of a given format and present them as a single source of data. Moreover, a datastore may support parallelism and provide efficient methods for retrieving data in such an environment.

In some embodiments, a user may enhance the datastore with additional features. These features may include capabilities for interfacing data in a custom format. The custom format may be designed by the user for a specific type of data or application. The user may thus interface with the enhanced datastore such as custom formatted data. The user may subsequently process that datastore via a data processing method that does not originally support the custom format but is covered by the datastore. The user may, for example, apply to the data a Hadoop implementation.

Figure 4:
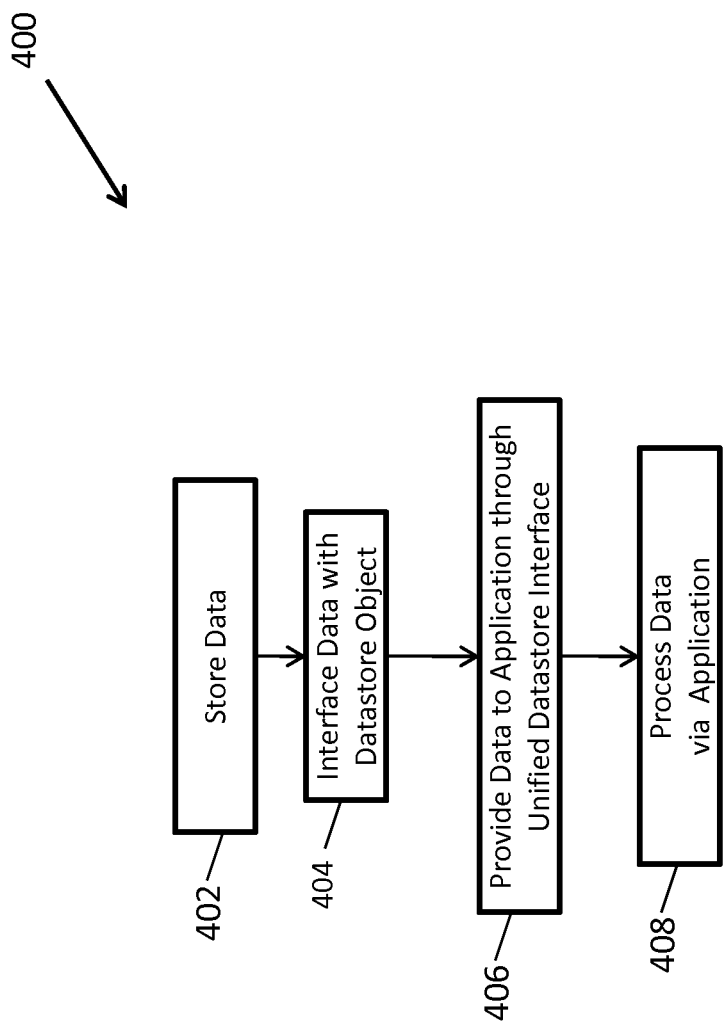
FIG. 4 shows a flowchart for handling data through the datastore according to some embodiments.

In various embodiments, the datastore enables computer applications to access and process different types of datasets through a single interface. Moreover, the datastore enables computer processors to process large datasets with sizes that exceed the capacities of the processors, e.g., their memory sizes, and thus, in the absence of the datastore, cannot be processed by the processors. FIG. 4 shows a flowchart 400 for handling data through the datastore according to some embodiments. In particular, flowchart 400 includes steps for storing, preparing, and processing the data.

In block 402, the data is stored in a storage environment. In block 404, the stored data is prepared for analysis by being interfaced with a datastore object. Such interfacing may include creating a datastore object for the data. The datastore may receive information, such as the location of data or type of the storage environment, and accordingly generate a datastore object that corresponds to that environment.

In block 406, links to the unified datastore interface or its methods are added to an application. The application may be a software or a program designed to read in and process the stored data. The datastore methods may include methods for reading data, modifying data, viewing data, writing into data, etc. Further, the datastore methods may include methods for sending the data to the application in a form that is usable by the application, or in sizes that can be handled by the application or the underlying one or more processors.

In block 408, the application receives the data and processes them. In various embodiments, the application may also output the results in one or more formats. For example, output formats may be compatible with a display device, writing to a storage device, transmitting results via network, or printing results via a printer.

Figure 5:
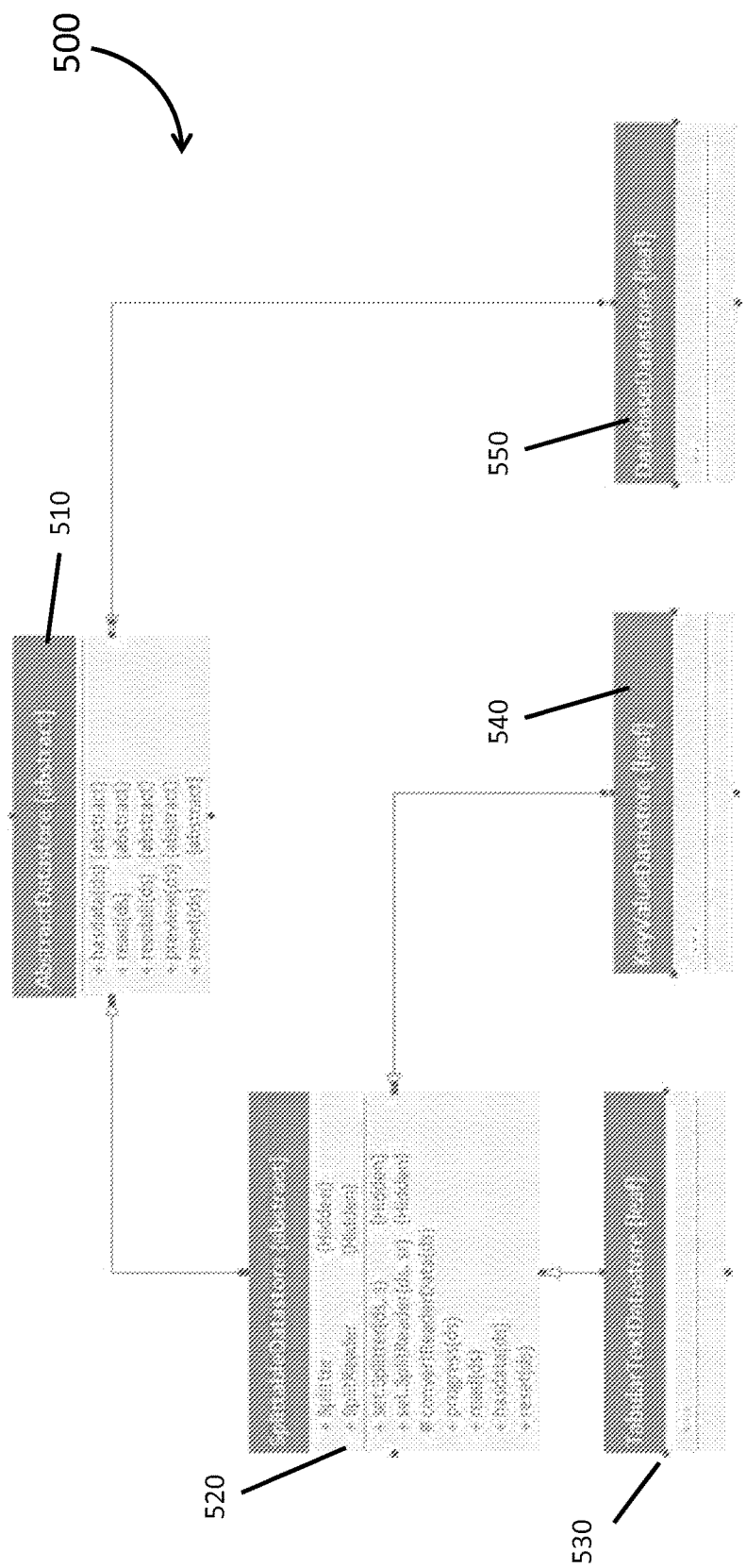
FIG. 5 shows a datastore class diagram according to some embodiments.

Various embodiments implement a datastore through an object oriented software structure. Some embodiments generate a datastore class to be the parent of different types of datastore subclasses for different types of datastores. FIG. 5 shows a datastore class diagram 500 according to one embodiment. Class diagram 500 includes a parent class parent datastore 510 and a splittable datastore class 520, which inherits from parent datastore 510. Further, two child classes inherit from splittable datastore 520, i.e., tabular text datastore 530 and keyvalue datastore 540. Diagram 500 also shows a database datastore 550, which inherits from parent datastore 510.

Splittable datastore class 520 inherits from parent datastore 510. Splittable datastore 520 may be defined for splittable datasets, that are, datasets that can be divided into multiple split sections. More particularly, splittable datastore 520 may define methods and properties that can be applied to such splittable datasets, such as splitting and assigning to different nodes. In some embodiments, splittable datasets are stored and processed in a parallel processing system.

In some embodiments, examples of splittable datasets include datasets that are formatted in key-value format or tabular text format. Accordingly, diagram 500 includes subclasses such as tabular text datastore subclass 530 and keyvalue datastore 540, each of which inherit from splittable datastore 520. These two subclasses correspond to datastores that interface tabular text formatted files and key-value formatted files, respectively.

Moreover, in diagram 500, database datastore subclass 550 inherits from parent datastore 510. Database datastore 550 interfaces with database type files.

A datastore class may expose one or more method members that correspond to different functions of the datastore, as further explained below. In diagram 500, for example, parent datastore 510 includes methods hasdata, readall, read, and preview. These methods may receive one or more input parameters that include a pointer to the datastore (ds) and may perform a function enabled by the datastore. A program may generate an instance of a datastore class, as a datastore object, to interface a dataset. The program may then use the datastore and its methods to extract or modify the data in the dataset.

In various embodiments, an instance of a class in class diagram 500 is generated through methods such as a class constructor. Some embodiments include a programming package to enable generating and using datastore objects. In some embodiments, a MATLAB package called, for example, matlab.io.datastore, provides such objects. A datastore object may also be generated via a datastore constructor if desired. For example, construct (1) below presents two different ways for generating a datastore object.

Construct (1)

| | | |
|---|---|---|
| 1 | ds1= matlab.io.datastore.MyDatastore(location) 3 | (1) |
| 2 | ds2 = matlab.io.datastore.MyDatastore(location, Name, Value, . . . ); | |

At line 1 of construct (1), a constructor method receives a location of the data to be interfaced and accordingly generates a datastore object ds1. At line 2, on the other hand, an alternative constructor method receives a location of the data to be interfaced. The constructor also receives one or more name-value pairs; and generates an object ds2. The name value pairs may, for example, determine the type of the data or the type of a container storing the data. The type or container of data may in turn determine the type of the datastore to interface with the data.

The type of the datastore may also determine the selection of the datastore constructor, that is, MyDatastore. In some embodiments, for example, a datastore constructor may be allocated to interface with one or more text files. Moreover, the datastore constructor may receive an offset from which the one or more files should be read. Construct (2) shows a syntax of such a datastore constructor according to an embodiment. In construct (2) an instance ds of a file-based datastore is generated through a corresponding class constructor of type FileBasedDataStore.

Construct (2)

$$ds=\text{matlab.io.datastore.FileBasedDataStore}(file, offset, size, \ldots) \qquad (2)$$

In construct (2), the class constructor receives input parameters that include a file, an offset value, and a size value. The file input parameter may be a string of characters that corresponds to a path of the stored file. The path may be an absolute path, a relative path, or a partial path. The offset input parameter may be a non-negative integer number. The offset may indicate the location in the file from which the datastore should start reading the file. The size input parameter may be a positive integer indicating the maximum size of the data that should be read from the file. In various embodiments the offset and the size may be in different units, such as bits or bytes.

In some embodiments, a computer program generates a datastore object through a function call. Construct (3) shows three different exemplary versions of a datastore function call for generating a datastore object according to different embodiments.

Construct (3)

| | | |
|---|---|---|
| 1 ds = datastore(location); | 4 | (3) |
| 2 ds = datastore(location, 'DatastoreType', 'type') | 5 | |
| 3 ds = datastore(__, Name, Value,...) | 6 | |

In the three versions shown in construct (3), a datastore function receives one or more input parameters, generates a datastore object, and returns a link ds to the datastore object. Each version may correspond to, for example, a function call in a MATLAB program.

Line 1 of construct (3) shows a first version for the datastore function. In this first version, the datastore function receives one input parameter for location. The location may correspond to an address of the stored data. The location may be, for example, a string of characters indicating an address of one or more stored file, such as 'C:\mydatafiles\*.csv'. The location may also be a cell array of strings indicating different addresses, or an object. In some embodiments, for example, where the interfaced data is a database, the location may be a connection object for connecting to the database.

The first version returns a datastore object that may have a type chosen from of a variety of types. These types include a text file, a tabular text file, a database, a set of name-value pairs, or an image type. The datastore system may determine the type of the returned datastore from the value of the location. In particular, the system may determine the type of the interfaced data from the value of the location. To a type of the interfaced data, the system may allocate a default type for the returned datastore. Moreover, if the system cannot determine the type of interfaced data, it may use a generic default value for the type of the returned datastore.

In some embodiments, the type of the returned datastore is consistent with the type of the interfaced data. If the interfaced data is a tabular text file, for example, the default for the returned datastore may be a tabular text datastore type. In another embodiment, the location may correspond to an SQL database and the default returned datastore may accordingly be of a database type.

When the stored data is in tabular text format, the location may be an address of a comma-separated-values (csv) file. The csv file may thus define a tabular text file that includes rows and columns. Based on the above-mentioned default, the returned datastore may be of a tabular text type.

For the tabular text data, the datastore may thus return a datastore that is of a default type or type specified by the program, such as tabular text datastore. These datastores may provide access to the interface data through column and row addresses that correspond to rows and columns of the input csv file. In some embodiments, the datastore may make available to the program all rows and columns of the input file. Alternatively, the datastore may make available a subset of those rows or columns. In some embodiments, the header of the available columns are called active variables. This subset may be determined from preset rules or may be sent by the program to the datastore as a parameter. The datastore object may, for example, include a variable "ActiveVariableNames". The program may set this variable to the header of one or more of the columns in the interfaced data. Doing so will cause the datastore to provide to the program data in those columns only.

Line 2 of construct (3) shows a second version of the datastore function call. This version receives three input parameters, one for the location, one for a name indicating the datastore type, and one for a value corresponding to that name, that is, the datastore type. This name-value pair instructs the datastore function about the type of the returned datastore. The second version may be selected over the first version if, for example, it is determined that the system cannot correctly determine the type of the returned datastore from the input parameter location, if the location corresponds to more than one type and is thus ambiguous, or if it is desired to overwrite the default return type corresponding to the interfaced data. Thus, a program may change the return type such that for a SQL input file, the return type be changed from a default SQL datastore type, for example, to a tabular text datastore type.

An example of using the second version of the function call is shown in construct (4).

Construct (4)

$$ds=\text{datastore}(\text{'C:\textbackslash mytestfiles\textbackslash*.csv'},\text{'DatastoreType'},\text{'sql'}) \quad (4)$$

In the function call of construct (4), the input parameter location is 'C:\mytestfiles\*.csv'. This input parameter indicates that the datastore should interface all csv files located under the folder C:\mytestfiles in the local file system. The second input parameter in construct 3 selects a name 'DatastoreType' indicating that the next input parameter determines the value of this name, that is, the value of the type of the returned datastore. The next input parameter, 'sql' determines that the returned datastore should be of an SQL datastore type and in particular, an SQL table datastore. In this case, the SQL type datastore may have rows and columns that correspond to those of the interfaced tabular text files.

Line 3 of construct (3) shows a third version of the datastore function call. This version receives input parameters that include one or more name-value pairs. A name may correspond to one of the variables for which the first version uses a default, and the corresponding value input parameter determines a value for that variable. This value may overwrite the datastore's default value for the variable.

In some embodiments, for example, the datastore may be extended for a data type that is not previously supported by datastore. For instance, the supported types of data types may include tabular text, SQL, image, or key-value formatted file. Some data, however, may be of an unsupported format, such as a Moving Picture Experts Group (MPEG) video format. The datastore may thus be extended by defining a new datastore object for MPEG type, and further define for this object methods such as read, preview, hasdata, readall, or reset. An MPEG datastore type my thus be generated using the datastore function call of line 3, and by supplying a name-value pair, such as "datastore-type" and "MPG".

A program may use one or more methods of a datastore object to extract or modify data in the dataset that is interfaced by the datastore. For example, a program may execute the method hasdata to determine whether any data is available for reading from the datastore. Construct (5) shows the syntax of the hasdata method.

Construct (5)

$$tf=\text{hasdata}(ds) \quad (5)$$

In construct (5), hasdata receives a pointer ds to a datastore; and returns a logical value indicating whether or not more data is available for extracting from the datastore. The returned value is true if such data is available. The returned value is on the other hand false if, for example, ds interfaces an empty set of data or if all data interfaced by ds has already been extracted. This method may utilize an internal tracking property of the datastore that tracks how much data has already been extracted from the datastore.

To extract data from a datastore, a program may execute the read method. Construct (6) shows the syntax of the read method.

Construct (6)

$$data=\text{read}(ds) \quad (6)$$

In construct (6), the read method receives as input parameter a pointer ds of a datastore. As an output, the read method in construct (6) returns data that is a chunk of data read from the datastore. The type of the returned chunk can depend on the type of the datastore ds. The datastore may define for a datastore type a default return type. For a tabular text, csv, Hadoop, or sql datastore, for example, the default return type may be MATLAB data type table. For an image type datastore, on the other hand, the return type may be an array of numbers with appropriate types, such double or unsigned integer.

The size of the chunk returned by the read method may be preset as a default, or set by the program. In some embodiments, the datastore sets the default size of a chunk based on the size of the memory used by the processor. Because the read method may provide the chunks for processing, the size of the chunk may be chosen such that it can fit into the processor's memory.

In some embodiments, the size of the chunk is selected such that it does not exceed a fraction of the processor's memory. The fraction may be, for example, one fourth, one third, one half, etc. Doing so will leave room for the processor memory to load, in addition to the chunk, other information such as the program or the results of the processing. In some multi-processor embodiments, the size of the chunk is determined based on the memory size for the processor that has the smallest memory. Alternatively, the size of the chunk sent to different processors may differ and depend on the memory size for the receiving processor.

In some embodiments, the size of the chunk also depends on the type of the datastore. For a tabular text datastore, for example, the default chunk may be defined as a specific number of rows, such as 10,000 rows. For an image type datastore, on the other hand, the default chunk may be defined as a number of images, such as one image. For a set of data referring to genome information, on the other hand, the chunk may be determined such that the dataset is divided into subsets that together carry some biological information and that excluding some of the data from the subset renders the subset unusable.

In some embodiments, the datastore object uses the tracking property to keep track of a read location in the interfaced data for reading a chunk. The preview method may not change this internal property, as the preview method normally outputs a part or all of the interfaced data for preview and not for processing. After a launching of the read method, on the other hand, the datastore object may set the property to a new location for reading a next chunk. When a program executes a read method, the datastore may extract a chunk of the data, outputs that chunk, and mark the location from which the next read method should be serviced. For a datastore that interfaces on file, the location may be an offset from the beginning of the file. For a datastore that interfaces multiple text files, on the other hand, the read location may be a combination of a pointer to the next file from which data should be read, and an offset value in that file from where the read should start. For a datastore that interfaces multiple images and in which a chunk is an image, the read location may be a point to the next image to be read.

The datastore may also use the read location in determining the return value for the hasdata method. This return value may, for example, be false if the read location points to an end of the data interfaced by the datastore.

A program may also invoke the read method in a different manner to further receive information about the read data. Construct (6.1) shows an exemplary syntax for invoking the read method in such a manner according to some embodiments.

Construct (6.1)

$$[data,info]=read(ds) \qquad (6.1)$$

In construct (6.1), the read method is invoked by requesting a pair of outputs. Each output may be an array. The first member of the pair, data, is similar to the one described for construct (6). The second member of the pair, info, may include the origin of the data and other types of metadata. Some of these metadata may be defined upon defining the class or determined when instantiating the object. Construct (7) shows an exemplary value of info resulting from executing a read method such as that of construct (6.1) for a tabular text datastore.

| Construct (7) | | |
| --- | --- | --- |
| 1 info = | 5 | (7) |
| 2 File: '/tmp/foo.txt' | 6 | |
| 3 Offset: 643405 | 7 | |
| 4 Size: 1942914 | 8 | |

In construct (7), the info returned by the read method shows an address of the interfaced text file, the offset in that file from where the data has been read, and the size of the read data. The offset and the size may be in bits, bytes, or other applicable units.

To extract all data interfaced by a datastore, a program may execute the readall method of a datastore object. Construct (8) shows the syntax of the readall method according to some embodiments.

Construct (8)

$$data=readall(ds) \qquad (8)$$

In construct (8), the readall method receives a pointer ds of a datastore. As an output, the readall method in construct (8) attempts to return all data interfaced by datastore ds. If reading all data exceeds the size of available memory, the method may return an out of memory error. The type of the read data can depend on the type of the datastore ds. This type may differ from the type of data returned by the read method. For an image type datastore, for example, the read method may return data for image, while the readall method may return a cell array of data for all images stored in the datastore.

To preview data interfaced by a datastore, a program may execute the preview method. Construct (9) shows the syntax of the preview method according to some embodiments.

Construct (9)

$$data=preview(ds) \qquad (9)$$

In construct (9), the preview method receives as input parameter a pointer ds of the datastore object. The preview method returns a subset of the interfaced data. The subset may be a section at the start of the data which can fit in a display. The format of the returned data may a default format associated to the datastore default type. For a tabular text datastore, for example, the previewed data may be formatted as a table. A user may utilize the preview method to check whether the datastore is configured properly and returns data as expected.

In some embodiments, a datastore object may also expose a reset method. Construct (10) shows the syntax of the reset method according to some embodiments.

Construct (10)

$$reset(ds) \qquad (10)$$

In construct (10), the reset method receives as input parameter a pointer ds of a datastore. Upon executing this method, a state of the datastore object is set to an initial state where no data has been read from it. In some embodiment, for example, the reset method includes setting the read location to the start of the data interfaced by the datastore.

Some datastore embodiments further enable splitting the dataset into two or more split sections. In particular, a datastore object may include a split method for splitting the dataset into split sections in a multi-node configuration in order to distribute the split sections among different nodes. The datastore assigns a split section to one of a plurality of nodes. In some embodiments, a split section can fit multiple chunks. A split section may, for example, have a size of 64 GB while a chunk may have a size of 8 GB.

In some embodiments, the size or the location of a split is set by default. Alternatively, some embodiments enable a user to determine the size or the location of a split. Further, in some embodiments, the size or the location of a chunk is set by default or by a user. One or more of the sizes or location may depend on characteristics of the processors or the data. For example, a size of a chunk may be chosen such that it does not exceed the processor size. Similarly, a location of a split or a chunk may be determined from a condition. The condition may be based on a maximum allowed size or based on a content of the dataset. For data involving genetic code, for example, the condition may indicate that locations of splits or chunks should be determined at least in part based on where in the dataset different genetic units occur.

In some embodiments, a datastore that enables splitting may also expose a progress method. Construct (11) shows the syntax of the progress method according to some embodiments.

Construct (11)

$$Pct = progress(ds) \quad (11)$$

In construct (11), the progress method receives as input parameter a pointer ds of a datastore. The progress method returns a value pct that indicates the percentage to which the datastore has been split. The return value may be, for example, a scalar double value between 0.0 and 1.0.

Figure 6:
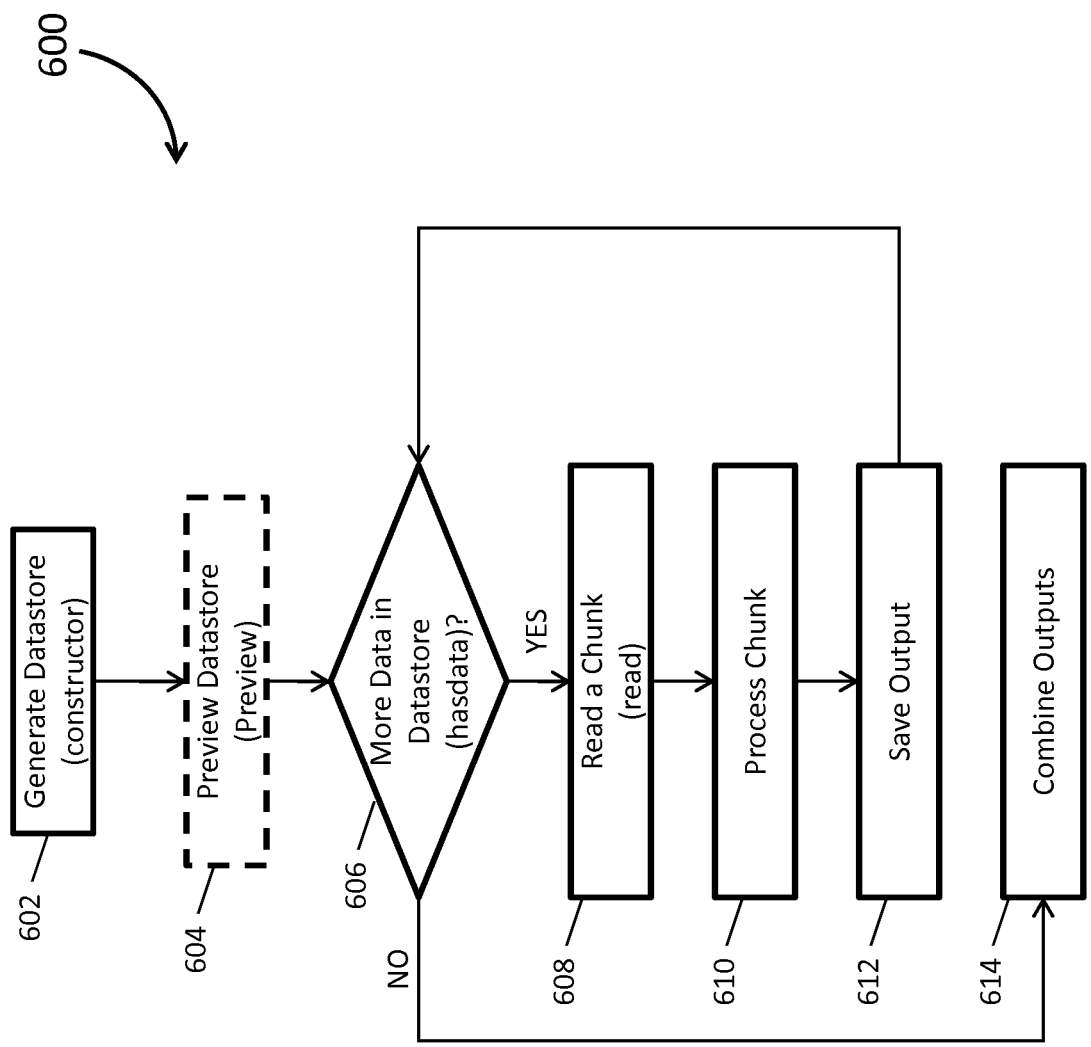
FIG. 6 shows a flowchart for using datastore functionalities according to some embodiments.

In some embodiments, an application utilizes different methods of the datastore to analyze or modify data. FIG. 6 shows a flowchart 600 for using these functionalities according to some embodiments. Flowchart 600 includes steps for interfacing with, extracting, and processing data. In some embodiments, flowchart 600 is executed by one or more programs executed by one or more processors in communication with one or more storage devices. The program may be a MATLAB program. The program may also be an interactive program, during which a user uses an interface to enter commands and receive results. The program may further be a batch-based program in which a user may not interact with the program while the program performs operations on commands and/or generates results.

In block 602, the program generates a datastore object to interface the data. To do so may require executing a datastore object constructor or function call. The datastore object may be of a type that corresponds to the type of the data.

In block 604, a program may execute a preview method to preview the data. Preview may return a small portion of the data to be previewed.

In decision block 606, the program checks whether there remain interfaced data that have not been extracted. If some data remains (block 606: Yes), the program enters a processing loop that includes blocks 608, 610, and 612.

During an iteration of the loop, in block 608 the program reads a subset of data as a chunk. The program may do so by executing the read method of the datastore object.

In block 610, the program processes the read chunk. Processing a chunk may include analyzing or modifying the data in the chunk. Analyzing data may include summarizing the data by, for example, finding an average. Modifying the data may include changing some of its content by, for example, changing the contrast in the pixels of an image. Further, processing a chunk may result in some output, such an average value. The output for different chunks may differ and depend on the content of the chunk. For example, data in two different chunks my result in two different average values.

In block 612, the program saves the output of processing the chunk for a given iteration and returns to the decision block 606.

The iterations of the processing loop repeat as long as some data remains to be read as chunks. Once no data remains (block 606: No), the program moves to block 614. In block 614, the program may combine the outputs generated by the iterations. Combining the outputs may indicate generating an overall analysis result from the outputs. For example, an iteration output may include a chunk-maximum, corresponding to the maximum value of some data in the chunk. Further, combining the outputs may include finding a maximum value among all the chunk-maximums, to derive an overall maximum.

Sample code (12) shows an exemplary program that employs a datastore according to an embodiment. In one embodiment, sample code (12) is a code written in MATLAB programming language. In some embodiments, a user enters code (12) via an interactive interface and receives the output via output methods that include a display.

| Sample code (12) | | |
|---|---|---|
| 1 tab = preview(ds) | 8 | (12) |
| 2 while hasdata(ds) | 9 | |
| 3    % read in a piece of the data as a table | | |
| 4    t = read(ds); | | |
| 5    % process the data | | |
| 6    myFun(t); | | |
| 7 end | | |

The program in sample code (12) starts after a datastore ds has been created to interface the stored data. Line 1 of code (12) previews the data interfaced by datastore object ds using the preview method of the object. The preview method may output to a display a subset of the data in the datastore.

Lines 2-5 of code (12) define a loop that extracts chunks of the interface data as tables. In particular, line 2 starts an iteration of the loop by checking whether there is more data to be read from the datastore. If so, line 4 reads in a chunk of that data into the variable t. In one embodiment, for example, datastore interfaces data that is formatted as a large table and t is a table that includes some rows of the large table.

At line 6, code (12) processes the chunk of data, t, via a function myFun. The details of the process is not shown in code (12) and may include any type of processing that could apply to data t. The processing may include, for example, making some calculations based on the data, generating a text based on those data, or modifying a subset or all of those data. In general, processing the data my include running more than one function. Line 6 of code (12) delineates the end of the loop.

In some embodiments, a datastore object also provides a write method for adding data to the data interfaced by the datastore. Sample code (13) shows an exemplary code for such addition according to an embodiment. In code (13), the variable ds is a link to a datastore that interfaces data formatted as a table.

| Sample code (13) | |
|---|---|
| 1  t = table; | 6    (13) |
| 2      t.Airline = 'AA'; | 7 |
| 3      t.Distance = 5.55; | 8 |
| 4  % Write this table to the datastore | 9 |
| 5      write(ds, t); | |

Line 1 of code (13) defines a table variable t. At lines 2 and 3, the code adds a new row to table t. In particular, for that new row, line 2 adds a value of 'AA' to a variable labeled 'Airline', and line 3 adds a value of '5.55' to a column labeled 'Distance.' At line 5, the code writes the data of table t into the datastore ds using a function call "write."

In various embodiments a datastores enables a user to process a large amount data. In one embodiment, for example, a user desires to process a large amount of text data related to airline carriers. FIG. 7A shows an exemplary text file 700 of such data according to one embodiment. Text file 700 is a csv file that includes some flight information. In particular, text file 700 defines 29 columns respectively labeled year, month, day of month, day of week, departure time, scheduled departure time, arrival time, scheduled arrival time, carrier, flight number, and so on. In various embodiments, file 700 includes thousands of rows for each year. In some embodiments, a datastore is utilized to interface with such data for one year or for a number of years. The data for different years may be included in one file or distributed among different files, each corresponding to the data for one year.

In some embodiments, the data in a dataset my change while the dataset is interfaced by a datastore. The datastore may, however, adjust to the change and continue interfacing the changed datastore. For example, a datastore may be defined for all csv files under a directory. While a program is reading from the datastore, a user may add a new csv file to the directory. In some embodiments, the datastore will include in the read process extracting data from the newly added files.

The total size of data in text file 700 may be such that a user cannot process the data as a whole. A user may, for example, wish to find an average delay time by analyzing the delay times recorded in the fifteenth column of text file 700, corresponding to arrival delay time. The user, however, may not be able to read in all data for that column, because the total size of the data exceeds the processor memory. The user may instead be able to generate the desired results by first generating a datastore object to interface the data. The datastore object then enables the user to read in and process data in chunks that can fit the memory. Construct (14) shows an exemplary functional call for generating such a datastore according to one embodiment.

Construct (14)

$$ds=\text{datastore}('S:\backslash bigdata\backslash datasets\backslash airline\backslash *.csv', \ldots$$
$$\text{'TreatAsMissing','NA'}) \quad (14)$$

The datastore function call in construct (14) generates a datastore object to interface csv files located under a folder 'S:\bigdata\datasets\airline\'. The last name-value pair in the function call further indicates that the datastore treats an entry 'NA' as a missing value.

FIG. 7B shows a summary view 710 of the datastore object ds according to one embodiment. Summary view 710 may result from a MATLAB command for displaying ds. Summary view 710 indicates that ds is a datastore object of the type tabular text. Moreover, view 710 shows some properties of the object. View 710 indicates, for example, that the datastore object interfaces 22 csv files; with 29 variables corresponding to the 29 columns in the tables, and also shows the format of the variables. The last four lines of summary view 710 indicate that, at this point, datastore ds considers all 29 variables as active variables. The active variables are used when the datastore outputs or processes the data by executing functions such as read, readall, and preview. The last line indicates a chunk size in this embodiment. In particular, the last line indicates that when executing the read method, the datastore will read the data in chunks of 20,000 lines.

A program may preview the data in the datastore using the datastore's preview method, as shown in construct (15).

Construct (15)

$$tab8 = \text{preview}(ds) \quad (15)$$

Construct (15) stores the results of the preview method in a table tab8. FIG. 7C shows a view 720 of tab8 according to one embodiment. As shown in view 720, tab8 includes a portion of the data interfaced by datastore ds in a tabular text format. In particular, view 720 lists the labels of the 29 columns of data along with eight rows of data. The first row, for example, has data that include year 1987, month 10, day of month 14, day of week 3, departure time 741, scheduled departure time 730, and so on. The second row, on the other hand, has data that include year 1987, month 10, day of month 15, day of week 4, departure time 729, scheduled departure time 730, and so on.

A program may use the datastore functionalities to process some or all of the data. In one example, a user may desire to analyze the arrival time delay. As shown in FIGS. 7A and 7C, the fifteenth column of data lists the arrival time delay in minutes. Alternatively, a program may calculate this delay by finding the difference between the arrival time and the scheduled arrival time. To analyze these delays, the program may use construct (16).

Construct (16)

$$ds.\text{ActiveVariableNames}='\text{ArrDelay}' \quad (16)$$

Construct (16) assigns the variable ArrDelay, corresponding to the arrival delay column, as the active variable of the datastore. FIG. 7D shows a summary view 730 of the datastore object ds after applying construct (16) according to one embodiment. When compared with summary view 710 of FIG. 7B, last four lines of view 730 indicate that, after construct (16), datastore ds considers the arrival delay as the active variable.

A program may utilize datastore ds to process the interfaced data. For example, after executing constructs (14) and (16), the program may implement code (17) to compute average arrival delay for all data interfaced by datastore ds.

| Code (17) | |
|---|---|
| 1  sums = [ ]; counts = [ ]; | 10 |
| 2  while hasdata(ds) | 11    avgArrivalDelay |
| 3 | 12    = sum(sums) / |
| 4      % read in the next chunk of data as a table | 13    sum(counts); |
| 5      t = read(ds); | 14 |
| 6 | 15    (17) |
| 7      sums(end+1) = sum(t.ArrDelay); | 16 |
| 8      counts(end+1) = length(t.ArrDelay); | 17 |
| 9  end | 18 |

Line 1 of code (17) defines two arrays, sum and count. Lines 2-9 include a loop, an iteration of which reads and processes a chunk of data from datastore ds. In particular, line 2 checks whether any data is left in ds to be read. Line 5 reads the next chunk as a table t. In the exemplary embodiment of FIGS. 7A-7D, the chunk stored in table t may include up to 20000 values corresponding to arrival time delay values for 20000 rows of the interfaced data. Line 7 calculates the sum of these values in the chunk t and assigns it to a corresponding member of array sum. Line 8 determines the number of values in the chunk, i.e., the length of array t, and assigns that number to a corresponding member of the array count. In this example, this length may be less than or equal to 20000. For example, the last chunk may include less than 20000 values, while some previous chunks may include 20000 values.

The loop may complete when all data in ds are read. Upon such completion, line 11 calculates the total sum of the delays by summing all members of the array sum; calculates the total number of the delays by summing all members of the array count; and calculates the overall average delay by dividing the total sum by the total count.

The datastore enables a user to interface data that are in various formats or contained in various types of data containers. The datastore further enables the user to read and process data that are in these different formats or containers without using or learning the specifics for handling the formats or containers.

In some embodiments, the datastore interfaces data located on a Hadoop distributed file system (HDFS). Construct (18) shows an exemplary functional call for generating such a datastore according to one embodiment.

Construct (18)

$ds$=datastore('$hdfs$://datasets/airline/*.$csv$', . . . 'TreatAsMissing','$NA$') (18)

The datastore function call in construct (18) generates a HDFS type datastore object ds to interface csv files contained in an HDFS file system. Once the program generates the object ds for these files, the program may use the same code as, for example, shown in code (17) to run a similar analysis.

In some embodiments, the datastore interfaces data that include a collection of image files. Construct (19) shows an exemplary functional call for generating such a datastore according to one embodiment.

Construct (19)

$ds$=datastore('.\image_file_folder\*.$jpg$') (19)

The datastore function call in construct (19) generates a datastore object ds to interface Joint Photographic Experts Group (JPEG) files stored under a folder '.\sandbox\bigdata\datasets\image_file_folder'. The extension 'jpg' in the location input parameter indicates that the interfaced data are image files. The datastore may therefore generates datastore object ds with an image type.

FIG. 8 shows a summary view 810 of the image type datastore object ds generated via construct (19) according to one embodiment. Summary view 810 may result from a MATLAB command for displaying ds. Summary view 810 indicates that ds is a datastore object of the image type. Moreover, view 810 shows that ds interfaces 142 JPEG files contained in the folder.

A program may preview the data in the image type datastore using the datastore's preview method, as shown in construct (20). The preview results may include one or more of the images interfaced by image datastore ds.

Construct (20)

images=preview($ds$) (20)

A program may utilize the image datastore ds to process the interfaced images. Processing the images may include analyzing some elements in the images or modifying some characteristics of the images. For example, after executing construct (19), a program may implement code (21) to increase the contrast in the interfaced images.

| Code (21) | |
|---|---|
| 1 while hasdata(ds) | 11 |
| 2   % Read in an image and its metadata | 12 (21) |
| 3   [img, imgInfo] = read(ds); | 13 |
| 4 | 14 |
| 5   % Increase the contrast | 15 |
| 6   img = imadjust(img,[.2.3 0;.6.7 1],[ ]); | |
| 7 | |
| 8   % save the file back to disk | |
| 9   imwrite(img, sprintf('bright_%s',imgInfo.filename)); | |
| 10 end | |

Code (21) defines a loop, an iteration of which modifies one image of the interfaced images. Line 1 checks whether any images are left to be read. Line 3 reads in a chunk of the interfaced data. In some embodiments, when the interfaced data are images as is the case here, a chunk of data is preset to be an image. Line 3, therefore, reads into the variable 'img' one image at a time. Line 3 also reads in the metadata corresponding to that image. Line 6 executes a function that increases the contrast of the read image. Line 8 stores the modified image back to the disk.

In some embodiments, the datastore interfaces data contained in a database. The data may be included, for example, in one or more large database tables. Construct (22) shows an exemplary functional call for generating such a datastore according to one embodiment.

Construct (22)

$ds$=datastore($conn$,'Select All unitCost FROM largedata') (22)

The datastore function call in construct (22) generates a datastore object ds of database type. The function call receives two input parameters. The first input parameter, 'conn', is a connection to the database to be interfaced. The second input parameter, 'Select All unitCost FROM largedata', is a string that defines a database query to apply to the database. The generated datastore interface the results of the query. In particular, the query in construct (22) extracts from a table called "largedata" all values for the field "unitCost".

FIG. 9A shows a summary view 910 of the database type datastore object ds generated via construct (22) according to one embodiment. Summary view 910 may result from a MATLAB command for displaying ds. Summary view 910 indicates that ds is a datastore object of the database type. Moreover, view 910 shows that ds interfaces data resulting from the above query after connecting to the database via the supplied connection.

The program may preview the data in the database datastore ds using the datastore's preview method, as shown in construct (23).

Construct (23)

tab8=preview($ds$) (23)

Figure 9B:
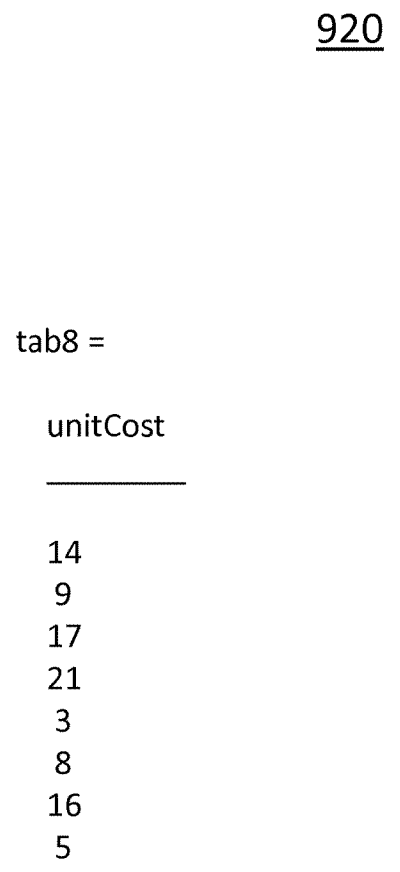

Construct (23) stores the results of the preview method in a table tab8. FIG. 9B shows a view 920 of tab8 according to one embodiment. As shown in view 920, tab8 includes a portion of the data interfaced by datastore ds in a tabular text format. In particular, view 920 shows 8 values for the field 'unitCost', the values resulting from the above database query.

A program may utilize the database datastore ds to process the interfaced data. For example, after executing constructs (22), the program may implement code (24) to compute an average unit cost for all data that results from the above query

| Code (24) | |
|---|---|
| 1  sums = [ ]; counts = [ ]; | 11 |
| 2  while hasdata(ds) | 12   (24) |
| 3 | 13 |
| 4      t = read(ds); | 14 |
| 5 | 15 |
| 6      sums(end+1) = sum(t.unitCost); | |
| 7      counts(end+1) = length(t.unitCost); | |
| 8  end | |
| 9 | |
| 10 avgunitCost = sum(sums) / sum(counts); | |

Line 1 of code (24) defines two arrays, sum and count. Lines 2-8 include a loop, an iteration of which reads and processes a chunk of data in datastore ds. In particular, line 2 checks whether any data is left in ds to be read. Line 4 reads the next chunk as a table t. Line 6 calculates the sum of the values of the unitCost field in the chunk t and assigns it to a corresponding member of array sum. Line 7 determines the number of values in the chunk, i.e., the length of array t, and assigns it to a corresponding member of the array count. Upon such completion of the loop, line 10 calculates the average unit cost in a manner similar to that used for finding average arrival delay.

As seen above, the datastore enables a user to access and process different data stored under different environments by using a unified interface. Further, a program may reuse the same code to do similar analyses on those different data. As an example, code (24) is identical to code (17), except for naming the final result avgunitCost instead of avgArrivalDelay. A program may give the two variables the same name (e.g., avgvalue) and accordingly use the same code in both cases. The datastore enables such reuse for the two sets of data that are stored in two different environments and are accessed in different ways; for code (17), the data are stored in a tabular csv formatted text file, while for code (24) the data are stored in a database. The first set of data may be accessed via methods for reading a text file or a csv file. Some embodiments utilize the MATLAB function txtscan to read a csv file. The second set may be accessed via database queries. But once the corresponding datastores are generated for the two sets, the same code can use methods in the unified datastore to process both sets of data and derive the overall average values for different types of data.

In some embodiments, datastore enables a user to apply the same code to datasets that have different formats and may thus require different methods to process the data. A first dataset may, for example, be stored in multiple tabular text files while a second dataset is stored in a sequence file used by Hadoop. The first dataset, therefore, can be read by methods such as fread, while the second dataset requires Java methods such as hadoop.io.SequenceFile.Reader.read. In the absence of datastore methods, therefore, the codes to process these two datasets should be different to include the above different methods. But, once the two datasets are interfaced via tabular text and HDFS types datastore objects, respectively, they can both be processed via the same set of methods provided by the unified datastore interface. For example, both datasets can be read via datastore's read method. Therefore, the two datasets can be processed via a code that includes datastore methods. A user may, for example, debug a code on the user's local machine by processing text files stored on user's local storage and then run the code against other files stored in a different format and in an HDFS environment.

Moreover, in some embodiments, datastore enables a user to use a unified set of constructors to adopt datasets to different containers. A user may, for example, store data in multiple tabular text files. The user may pass the location of these files to a datastore constructor with input parameters that indicate the data should be stored in an HDFS ready sequence file. The constructor may read in the text files, convert them into one or more sequence files, and contain those files in an HDFS system. In some embodiments, to perform the conversion, the system uses datastore's write method. In particular, the datastore system can write the text files into an existing HDFS type datastore by adding their data to the corresponding sequence file.

Users often try to manage larger datasets by increasing the amount of storage, processor speed, memory capacity, or operating system address space, or by employing multi-processing techniques. But regardless of the speed by which the technology grows in these areas, the size of input data often grows faster, such that the large datasets exceed the capacities of most advanced systems. Moreover, many users may not want to update to the latest technologies and instead wish to use their existing systems, with limited capabilities, to manage datasets with sizes that exceed those capabilities. Moreover, users may want to access datasets that are stored in storage environments of different types. Dealing with those datasets may require using new techniques that can adapt to different environments and enable them to manage data that are beyond their normal capacities.

In an exemplary case, the input data may include information for a number of flights by different airline carriers. FIG. 10 shows an illustrative section of a set 1000 of such input data according to an embodiment. In particular, input data 1000 is formatted into a table with column headers such as year, month, day of month, etc. More specifically, columns I, O, and S respectively correspond to unique carrier identification, arrival delay, and distance. The first four values shown in column I are CO, DL, US, and AA, each identifying one of four different airline carriers. The first four rows of input data 1000, thus, correspond to one flight of each of these four carriers. The corresponding values in column I list the arrival delay for each flight, in minutes. The corresponding values in column S, on the other hand, list the distance traveled for each flight, in miles. In one embodiment, a user wishes to process input data 1000 to derive an average arrival delay for each airline carrier, an average distance traveled by each carrier, or both.

Figure 11:
FIG. 11 shows a flowchart for processing input data in a MapReduce framework according to some embodiments.

Some embodiments provide unified methods for processing data, such as those of FIG. 11, in different processing environments. These environments may include, for example, a user's personal computer, or a distributed multi-processor system employing, for example, a parallel processing technique.

Some embodiments utilize a unified MapReduce system for processing data. The unified MapReduce system enables a computing system to process data whose size normally exceeds the system's memory capacity or processor capabilities. Moreover, the MapReduce system enables a program to generate code that can be executed in multiple environments, e.g., in both single processor (serial) and multi-processor (parallel) environments, with little or no change.

In some embodiments, the unified MapReduce system employs a MapReduce framework for processing some input data. A MapReduce framework divides the input data into multiple subsets, processes the subsets independently to derive multiple intermediate outputs, and combines the intermediate outputs to derive one or more final outputs. In some embodiments, the MapReduce framework processes the subsets of input data or the intermediate outputs by a plurality of processors in a multi-processing environment. The MapReduce framework may include the methods for orchestrating the transfer of data among different processing units and processing the data by different units.

FIG. 11 shows a flowchart 1100 for processing the input data in a MapReduce framework according to some embodiments. In particular, flowchart 1100 includes steps for dividing the input data into subsets, processing the subsets to produce intermediate outputs, and processing the intermediate outputs to produce final outputs. In various embodiments, a system including one or more processors performs the processing.

In FIG. 11 at block 1102, the system prepares the input data. Preparing the input data may include identifying keys and values that will be used for processing the data. For the analysis of input data 1000 in FIG. 10, for example, the keys may include the carrier identification, and the values may include the arrival delay and the distance, and some other information derived from the input data, such as the fight number associated with the inputs.

Preparing the input data may also include dividing the input data into separate subsets and assigning those subsets to different worker systems. In some embodiments, a subset is designated to be processed together, to result in one or more intermediate outputs corresponding to that subset. In some embodiments, a server system, sometimes called a master node, divides the input data into the subsets and assigns a subset to a worker system. A worker system may in turn process its assigned subset of data to derive the corresponding one or more intermediate outputs. The worker system may alternatively divide the subset into smaller subsets and assign the smaller subsets to a group of worker systems for processing the smaller subsets and deriving intermediate outputs.

Returning to FIG. 11, in block 1104 the system performs a map operation. The map operation may be performed by different worker systems (sometimes called a mapper nodes). Mapper nodes are nodes that execute instances of a mapper function to process the subset assigned to that worker system. In various embodiments, a mapper function receives the subset of the input data, processes the subset, and outputs intermediate output data corresponding to the subset. The details of the mapper function may depend on the specific MapReduce operation. The mapper function may, for example, filter and sort the subset to produce the intermediate outputs.

In some embodiments, the intermediate outputs include intermediate keys and intermediate values that correspond to the intermediate keys. The intermediate keys may be the same as or different from the original keys. The intermediate values, on the other hand, may include values that are collected or produced during mapping. For the input data 1000 of FIG. 10, for example, an intermediate key may include the carrier identifications for a specific flight. The corresponding intermediate value, on the other hand, may include one of the arrival delay and the distance for that flight.

In block 1106, the system performs a shuffle operation, which in some embodiments is called a shuffle sort operation. The shuffle operation may include collecting the intermediate outputs, grouping them, and allocating a group to one or more worker systems. The system may, for example, group together intermediate outputs that should be processed together and allocate them to a worker system to be processed together. A group may include, for example, intermediate outputs that share the same intermediate key. For the input data 1000 of FIG. 10, for example, a group of intermediate outputs may consist of a set of intermediate key-value pairs for which the keys are the same, corresponding to the same carrier, and the values are the arrival delays for that carrier. Another group of intermediate outputs may consist of a set of intermediate key-value pairs for which the keys correspond to the same carrier and the values are the distances traveled by different flights of that carrier. In some embodiments, a group of intermediate outputs is delivered to a worker in chunks.

In block 1108 of FIG. 11, the system performs a reduce operation. The reduce operation may include identifying a worker system (sometimes called a reducer node) to which a group of intermediate outputs is assigned. Each reduce node is a node that executes an instance of a reducer function to process the assigned group. In various embodiments, a reducer function receives the group of intermediate outputs, processes the outputs, and produces one or more final outputs for that group. The details of the reducer function may depend on the specific MapReduce operation. In some embodiments, the reduce operation includes summarizing, summing, averaging, or finding a maximum of or a minimum of, the data in the group of intermediate outputs. In some embodiments a final output includes a pair consisting of a final key and a final value corresponding to the key. In the example discussed for the input data 1000 of FIG. 10, for instance, a final output may include an identification of a carrier and an average travel distance for that carrier. Another final output may include an identification of a carrier and an average arrival delay for that carrier.

In block 1101 of FIG. 11, the system produces one or more final outputs. Producing the final output may include gathering, summarizing, and sorting different final outputs derived by different reducer nodes, and outputting the results. The outputs may, for example, be stored in a storage device. In the example discussed for the input data 1000 of FIG. 10, for instance, the final output may be a table listing airline carriers and, for each carrier, an average travel distance and an average arrival delay.

In various embodiments, the MapReduce framework orchestrates execution of different steps in flowchart 1100 by the computing system. This orchestration may be performed by one or more master nodes. In a multi-processing environment, for example, some of the operations may be executed in parallel by multiple processing units. For instance, different mapper nodes may perform their map operations in parallel to produce multiple intermediate outputs, or different reducer nodes may perform their reduce operations in parallel to produce multiple final outputs. The master node may coordinate the timing of the operations or movement of data among different processors, memories, and storage devices.

Figure 12:
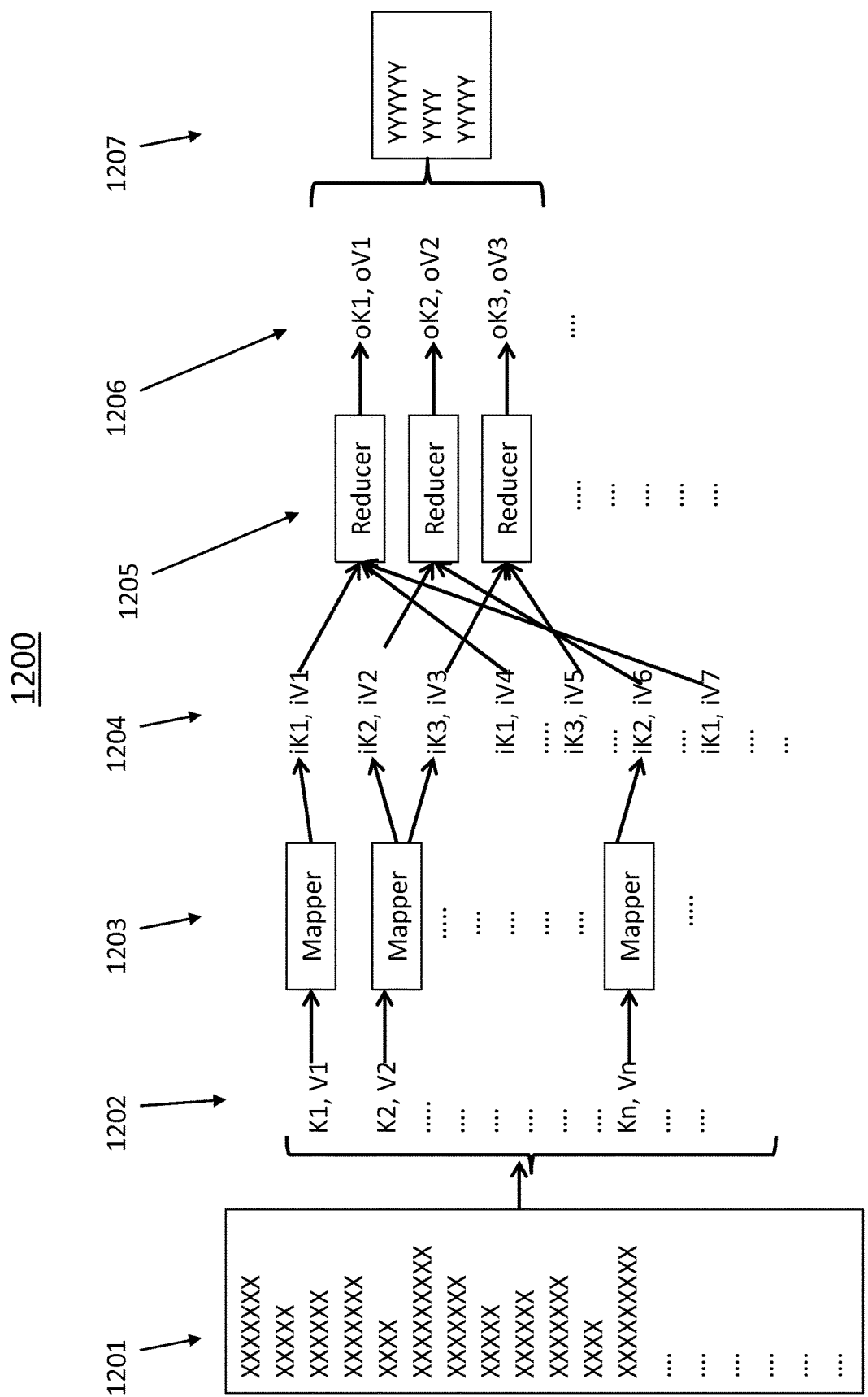
FIG. 12 shows a schematic of processing input data in a MapReduce framework according to some embodiments.

FIG. 12 shows a schematic 1200 of processing the input data in a MapReduce framework according to some embodiments. In summary, schematic 1200 shows that a MapReduce system receives input data 1201, processes the input data through different stages of the MapReduce operation, and derives output data 1207.

In particular, during the preparation stage, the system receives input data 1201 and generates input pairs 1202. An input pair 1202 includes a key and a value. Moreover, an input key-value pair 1202 is assigned to a mapper node 1203 to execute a map operation on the pair.

During the map operation, a mapper node 1203 processes its assigned input key-value pair 1202 to derive one or more intermediate key-value pairs 1204. During the shuffle stage, the system regroups the intermediate key-value pairs 1204 based on their intermediate keys, and assigns a group with the same intermediate key to the same reducer node 1205. During the reduce stage, a reducer node 1205 processes the group of intermediate pairs 1204 to derive an output pair 1206. During the output phase, the system organizes output pairs 1206 to derive and put out output data 1207.

Figure 13:
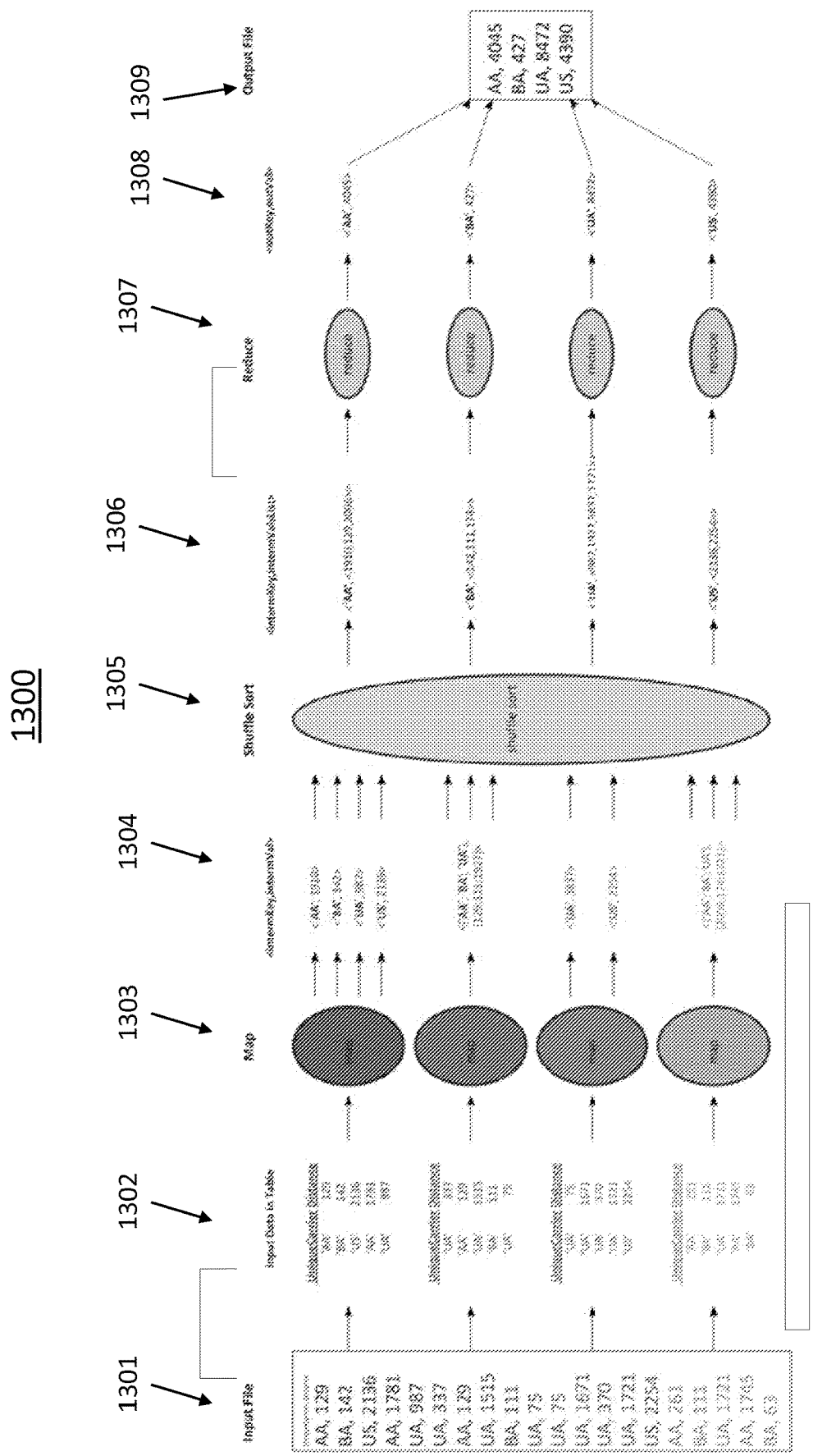
FIG. 13 shows a schematic of processing input data in a MapReduce framework according to an embodiment.

FIG. 13 shows a schematic 1300 of processing input data in a MapReduce framework according to another embodiment. In the embodiment of schematic 1300, the MapReduce system processes input data 1301, which includes statistics for multiple flights of different airlines, and derives output data 1309, which includes total distance traveled by different airlines.

Input data 1301 includes flight statistics for multiple airline carriers during a specific period of time, such as a ten year period. These statistics included data such as the distances traveled in each flight. Different entries in input data 1301 indicate that, for example, a flight by an airline AA traveled 129 miles, another flight by an airline BA traveled 142 miles, a third flight by an airline US traveled 2136 miles, a fourth flight by the airline AA traveled 1781 miles, and so on. In some embodiments, input data are interfaced by one or more datastores.

During the preparation stage, the system receives input data 1301 and derives from them input datasets 1302. An input dataset includes a set of input keys and a corresponding set of input values. Each input key indicates the airline for one of the entries in input data 1301 and the corresponding value indicates the traveled distance in that entry. In some embodiments, an input dataset 1302 includes information for a group of entries in input data 1301. In some embodiments, an input dataset 1302 is in the form of a table. In some other embodiments, input dataset 1302 is in the form of a string.

The system assigns input datasets 1302 to mapper nodes 1303 for executing a map operation on the dataset. During the map operation, each mapper node 1303 processes its assigned input dataset 1302 to derive intermediate outputs 1304. For a mapper node 1303, the intermediate outputs 1304 may include an intermediate dataset, including one or more intermediate key-value pairs. An intermediate key-value pair includes an identifier of a carrier for a flight and the distance traveled during the flight. Intermediate datasets may be interfaced by one or more datastores.

During the shuffle stage, a shuffle sort node 1305 performs a shuffle sort operation. This operation includes grouping the intermediate outputs 1304 and generating one or more entries for grouped data 1306. Shuffle sort node 1305 may be one or more servers. In some embodiments, shuffle sort node 1305 is one of the one or more master nodes. A grouped data entry is to be assigned to a reducer node 1307 for processing. In schematic 1300, for example, a grouped data entry 1306 includes an identifier of an airline carrier and multiple distance values extracted from multiple flights for that carrier. The first grouped data entry 1306, for example, includes an airline indicator AA, and distance values for that airline, which include 1910, 129, and 2006. This grouped data entry 1306 is assigned to the first reducer node 1307. Grouped data may also be interfaced by one or more datastores.

During the reduce stage, a reducer node 1307 processes its assigned grouped data entry 1306 to derive an output entry 1308. In schematic 1300, for example, the reduce operation includes summing all distances in a grouped data entry to derive the total distance for that entry. The first output entry 1308, for example, includes a key-value pair. The key-value pair consists of the airline identifier AA of the first grouped data entry 1306 and a total distance 4045 that is derived by summing all distances in the first grouped data entry 1306.

During the output phase, the system combines output entries 1308 to derive and put out output data 1309. Output data lists identifiers for multiple airlines, and the distance traveled by each airline as derived from input data 1301. Output data may be interfaced by one or more datastores.

Various embodiments employ different environments for the MapReduce operations. A program may, for example, perform a MapReduce operation in a single processor environment or a multi-processor environment. Moreover, the program may employ a MapReducer object of a type selected from multiple types, such as serial, parallel, and parallel Hadoop.

Figure 14:
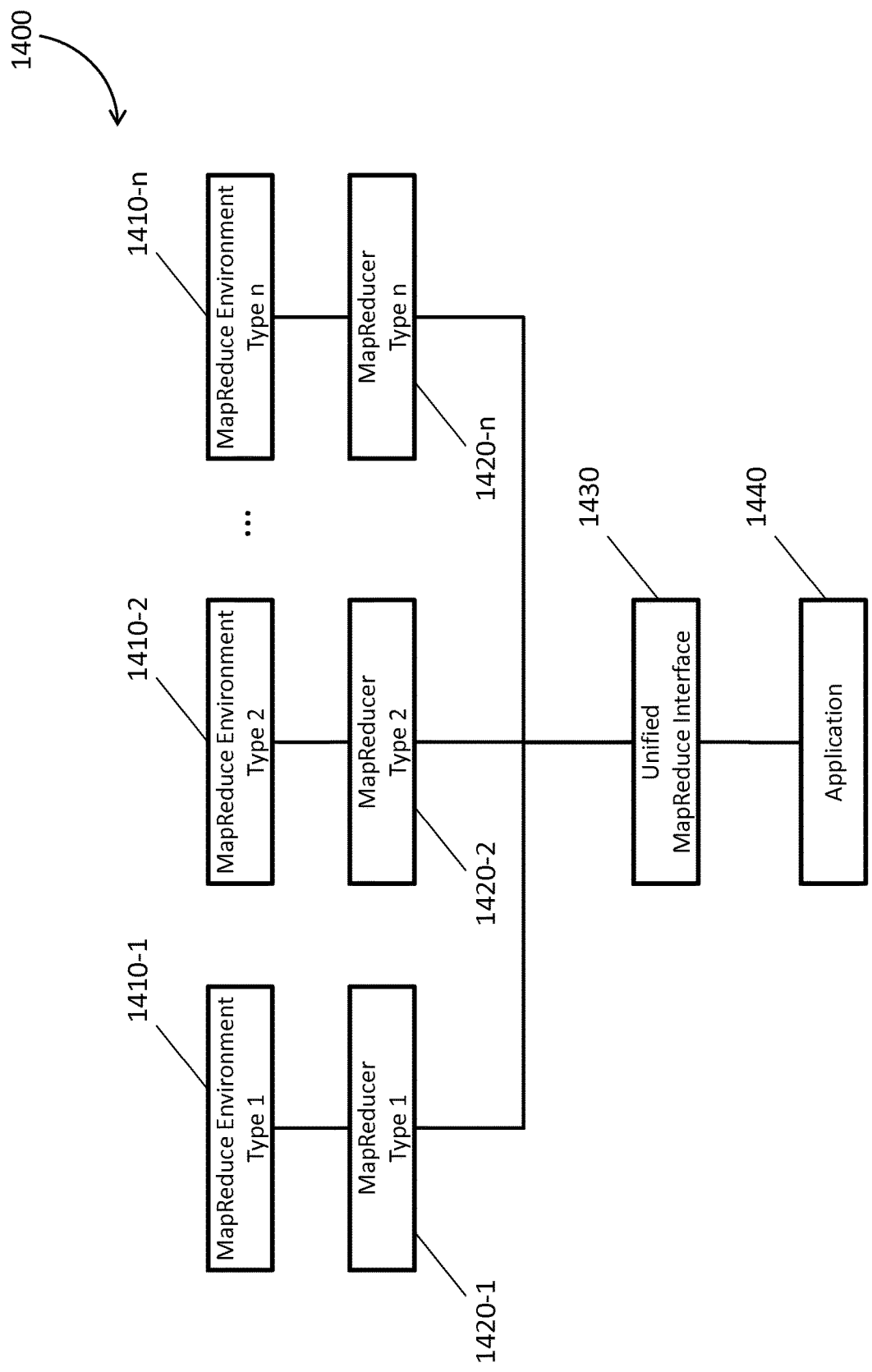
FIG. 14 is a diagram showing a schematic of a unified MapReduce mechanism for various MapReduce environments according to some embodiments.

Some embodiments provide a unified MapReduce system for employing the MapReduce operation in different environments. FIG. 14 is a diagram 1400 showing a schematic of a unified MapReduce system for various MapReduce environments according to some embodiments. Diagram 1400 shows multiple MapReduce environments 1410, shown as 1410-1, 1410-2, . . . 1410-n; multiple MapReducer objects 1420, shown as 1420-1, 1420-2, . . . 1420-n; a unified MapReduce interface 1430, and an application 1440.

MapReduce environments 1410 may be of one of different types. These types may include serial processing environment, parallel processing environment, parallel MATLAB environment, parallel Hadoop environment, and MATLAB deployment environment. For a MapReduce environment 1410, the MapReduce system can generate a MapReducer object 1420, which is adapted to that environment. Therefore, as shown in diagram 1400, the MapReducer object may have a type that corresponds to the type of the MapReduce environment 1410. Different types of MapReducer objects 1420 may include serial, parallel, parallel MATLAB, or parallel Hadoop. MapReducer object 1420 includes methods adapted for the corresponding environment. For example, a serial MapReducer may run the process on a single MATLAB thread, whereas a MapReducer object for a parallel Hadoop environment may cause the process to be spread across multiple servers in an Hadoop cluster.

The MapReduce system further includes a unified MapReduce interface 1430. Interface 1430 implements MapReduce operations in environments 1410 through the corresponding MapReducer object 1420. On the other hand, unified MapReduce interface 1430 presents a unified interface to application 1440. Through this unified interface, application 1440 can perform MapReduce operations in different MapReduce environments 1410. In doing so, application 1440 may use a single syntax irrespective of the environment that executes the MapReduce operation. Application 1440 may be a software application or a computer program. Further, Application 1440 may be executed by one or more processors, such as those in a server, a worker, or a client.

In some embodiments, the MapReduce system employs an object oriented structure for generating different instances of a MapReducer object. For example, a MapReduce system may generate a MapReducer object by calling a gateway factory function. Construct (25) shows various syntaxes for calling a gateway factory function mapreducer( ) according to different embodiments. The syntaxes may correspond to instances of the MapReducer object as implemented by the MapReduce system.

---

Construct (25)

```
1  mr= mapreducer (0)
2  mr = mapreducer(poolObject)
3  mr = mapreducer ( )
4  mr = mapreducer(parallel.cluster.Hadoop(N1, V1, N2,
      V2,...))
5  mr = mapreducer('CustomProfile')
6  mapreducer(...)
7  mr = mapreducer(..., 'ObjectVisibility', 'Off')
8  mapreducer(existingMapReducer)
9  existingMapReducer = mapreducer(existingMapReducer)
```
(25)

---

The calls in construct (25) differ in the input arguments or output value syntax. Based on these input and output syntaxes, the MapReduce system may determine a type of the generated MapReducer object.

In the syntax shown at line 1 of construct (25), the mapreducer function is called with an argument '0'. This call generates a MapReducer object of serial type and returns a link to that object.

In the syntax shown at line 2, on the other hand, the mapreducer function is called with an argument that is a pool object. This call generates a MapReducer object of a parallel type based on the object pool and returns a link to that object. The pool object may determine a pool of worker systems to be used for the parallel processing in the MapReduce operation. The Pool object may encapsulate information about where to run the MapReduce operation. It may represent a collection of local worker systems, or may represent a collection of worker systems from an existing MDCS cluster as implemented by MATLAB In the syntax shown at line 3, the mapreducer function is called with no arguments. This call generates a MapReducer object of a default type and returns a link to that object. The default type may be preset or may be set by a program. Some embodiments determine the default type based on available computing environments. In some embodiments, if a parallel computing environment is available, the default type call at line 3 generates a parallel type MapReducer. If, on the other hand, such environment is not available, the default type call at line 3 generates a serial type MapReducer.

In the syntax shown at line 4, the mapreducer function is called with an argument that is a link to a parallel cluster Hadoop instance. This call generates a MapReducer object of parallel Hadoop type and returns a link to that object. In the syntax shown at line 4, the input cluster determines where the MapReduce processes should run. The parallel cluster Hadoop instance itself may be built based a number of name-value pairs (N1-V1, N2-V2, etc). In various embodiments, the input names N1, N2, N3, etc, may include one or more of the names HadoopinstallFolder, HadoopConfigurationFile, HadoopProperties, ClusterMatlabRoot, MaxNumWorkers, RequiresMathWorksHostedLicensing, LicenseNumber, AutoAttachFiles, AttachedFiles, and. AdditionalPaths.

The name HadoopinstallFolder may correspond to the installation folder for Hadoop, and its value should be the path to that folder. The name HadoopConfigurationFile may correspond to one or more Paths to one or more XML configuration files that contain properties to be passed to Hadoop. The value for this field can be an empty string, a path, or a cell array of paths. The name HadoopProperties may correspond to a map of key-value pairs to be passed directly to Hadoop's configuration object and its value may include such a map. The name ClusterMatlabRoot may correspond to the installation folder for the MATLAB workers on the cluster. Its value may be an empty string or a path to the installation folder. The name MaxNumWorkers may correspond to the number of MATLAB workers available to the job and its value should be a positive integer determining that number. The name RequiresMathWorksHostedLicensing may correspond to a Flag to specify whether the cluster uses MathWorks hosted licensing, its default value may be false, and its value should be a logical scalar. The name LicenseNumber may correspond to a license number for MathWorks hosted licensing and its value is a string for that license number. The name AutoAttachFiles may correspond to a Flag to specify whether code files are automatically sent to cluster, its default value is true and its value is a logical scalar. The name AttachedFiles may correspond to a list of additional files to send to the cluster, its default value is an empty list, and its value may be in the form of a cell array of strings. The name AdditionalPaths may correspond to a list of additional paths to add to the workers MATLAB path. Its default value is an empty list and its value may be in the form of a cell array of strings.

In some embodiments, the system generates a MapReducer object of parallel Hadoop type by first defining a Hadoop cluster. Construct (26) shows the syntax of the function calls for one such embodiment.

---

Construct (26)

```
1 hadoopCluster = parallel.cluster.Hadoop(...         5
2          './HadoopFolder1',./HadoopFolder2',...);   6   (26)
3
4 mr = mapreducer(hadoopCluster)
```

---

Lines 1-2 of construct (26) define a Hadoop cluster by providing the details of the cluster to a constructor for such a cluster (parallel.cluster.Hadoop). Line 4 passes the Hadoop cluster to the mapreducer function call.

Some embodiments enable a program to deploy a code developed in a first environment to a second environment. In particular, some embodiments enable a program to first develop and debug a MapReduce operation in MATLAB code. Once complete, the program can use a deploy tool deploy the MATLAB code to a parallel Hadoop environment. Sample code (27) illustrates an example of such deployment.

---

Code (27)

```
1 mapreducer (...)                                      5  (27)
2 if isdeployed
3 mapreducer(matlab.mapreduce.DeployHadoopMapReducer)
4 end
```

---

At line 1 of sample code (27) a MapReducer object is generated and set as the current MapReducerobject. Line 2 checks whether the code is running in a DEPLOYED scenario. If so, line 3 generates a deployed Hadoop MapReducer object and set it as the current MapReducer object. If, on the other hand, the code is running in a NOT-DEPLOYED scenario, line 3 is not executed and the current MapReducer object will be the one generated at line 1. The remainder of the code can utilize the current MapReducer object as set in lines 1-4. Code sample (27) can thus be developed and debugged in one environment, such as non-deployed, and then run in another environment, such as deployed, with no change to the code. The environment of the code can be determined and changed at runtime.

In some embodiments, the arugument to the mapreducer call in line 3 of code (27), that is, matlab.mapreduce.DeployHadoopMapReducer, defines an instance of a corresponding class. The class has properties that include parameters HadoopinstallFolder, HadoopConfigurationFile, and HadoopProperties. The parameter HadoopinstallFolder may correspond to a path to the installation folder for Hadoop. The parameter HadoopConfigurationFile may correspond to one or more Paths to one or more XML configuration files containing properties that will be passed to Hadoop. This parameter may be an empty string, or a cell array of the corresponding one or more paths. The parameter HadoopProperties may correspond to a map of key-value pairs that may be passed directly to Hadoop's configuration object.

Some embodiments enable a user to define a customized type for a MapReducer object for a specific profile, and to generate an instance of that type. The syntax shown at line 5 of construct (25) corresponds to such a case. At line 5, the mapreducer function is called with an argument that corresponds to that specific profile and returns a MapReducer object of the customized type.

The profile may represent the methods for interacting with a cluster environment. More generally, the mapreducer function may receive an object that corresponds to executing a MapReduce framework for an environment. The mapreducer function can accordingly generate a MapReducer object that can be used by the unified MapReduce interface for executing MapReduce in that environment.

Some embodiments enable generating more than one MapReducer objects in the same program. Moreover, some embodiments set a MapReducer object as a current MapReducer object. The current MapReducer object may be one of multiple MapReducer objects generated by a program. In some embodiments the current MapReducer object has a global scope and persists even if the program does not store a reference to it. The current MapReducer object can be used as the default MapReducer object in a MapReduce operation, if the operation does not specify a MapReducer object. A MapReducer object that is not set as the current MapReducer object may be destroyed if it goes out of scope.

In some embodiments, a program may generate a MapReducer object and set it as the current MapReducer object without receiving its value as an output. The syntax shown at line 6 of construct (25) corresponds to such an embodiment. At line 6, the mapreducer function is called with a set of arguments such as those mentioned above and with no return value. This call generates a MapReducer object of a type that corresponds to the arguments, and sets it as the current MapReducer object.

In some embodiment, when a mapreducer call generates a MapReducer object, the call also sets the generated MapReducer object as the current MapReducer object. In some embodiments, function calls at lines 1 to 6 of construct (25) are such calls, i.e., these calls generate a MapReducer object and set it as the current Mapreducer object. Calls 1 to 5 also return an address of the generated MapReducer object, while call 6 does not.

In some embodiments, a mapreducer call determines whether to set the generated MapReducer object as the current MapReducer object based on a value of a "ObjectVisibility" variable. In some embodiments, ObjectVisibility is a common property that is shared by all instances of the MapReducer function. The default value of the ObjectVisibility variable is "On." This value indicates that when an instance of the mapreducer function generates a MapReducer object, the MapReducer object is set as the current MapReducer object.

Some embodiments, however, enable a mapreducer call to generate a MapReducer object and return its address without setting it as the current MapReducer object. A mapreducer call may do so by setting the ObjectVisibility to an Off value. The syntax shown at line 7 of construct (25) shows one such case. At line 7 the mapreducer function has a return value and is called with a set of leading arguments such as those mentioned in relation to lines 1-5. In this syntax, however, the arguments further include an additional name-value pair that are "ObjectVisibility" and "Off". This additional argument sets the value of ObjectVisibility to Off. This call thus generates a MapReducer object of a type that corresponds to the leading arguments, and returns its address. Further, due to the additional name-value pair, the call does not set the MapReducer object as the current MapReducer object. A program may utilize this MapReducer object by explicitly using its address (i.e., "mr" at line 7).

A program may render non-current MapReducer object into the current MapReducer object. Lines 8 and 9 of construct (25) illustrate two different syntaxes of the mapreducer function, which enables such rendering. In the syntax shown at line 8, the mapreducer function is called with no return value and with an argument that is an address of an existing MapReducer object that is visible to the instance of the mapreducer function call. The existing MapReducer object may or may not be the current MapReducer object. The call at line 8 sets the existing MapReducer object as the current MapReducer object. Similarly, in the syntax shown at line 9, the mapreducer function is also called with an argument that is an address of an existing MapReducer object and also with a return value. This call also sets the existing MapReducer object as the current MapReducer object and further returns its address.

Some embodiments enable retrieving the current MapReducer object. Construct (28) shows two different syntaxes for calling a helper function gcmr that enables this feature according to one embodiment.

| Construct (28) | | |
|---|---|---|
| 1 theCurrentMapReducer = gcmr( ) | 3 | (28) |
| 2 theCurrentMapReducer = gcmr('nocreate') | | |

In the syntax shown at line 1 of construct (28), the gcmr helper in called with no arguments, and returns an address of the current MapReducer object. In the syntax shown at line 2 of construct (28), on the other hand, the gcmr helper in called with a string input of 'nocreate' and returns an address of the current MapReducer object. In some embodiments, if the program deletes the current MapReducer object, the gcmr helper selects, as the current MapReducer object, one of already generated MapReducer objects that exist (if any).

In some embodiments, a gcmr helper may be called where no MapReducer object exists. Is such a case and under the syntax shown at line 1 of construct (28), the gcmr helper may generate a new MapReducer object of a default type and return the address of that new MapReducer object. The syntax shown at line 2, on the other hand, does not generate a new MapReducer object and instead returns a null value.

Some embodiments employ a unified MapReduce interface to perform a MapReduce operation. FIG. 15 shows a flowchart 1500 for processing some input data through one or more MapReduce environments according to some embodiments. In particular, flowchart 1500 includes steps for generating a MapReducer object and using that object through a unified MapReduce interface. In some embodiments, one or more of the steps in flowchart 1500 are performed by one or more processors executing a computer program.

In block 1502, a MapReduce environment is determined, which can be used for the MapReduce operation. In block 1504, a MapReducer objet is generated. In some embodiments, the MapReducer object is of a type that corresponds to the type of the MapReduce environment. In some embodiments, the MapReducer object is generated through one or more of the syntaxes shown in construct (25). A default type MapReducer object may, for example, be generated by executing construct (29), as explained in relation to line 3 of construct (25).

Construct (29)

$mr$=mapreducer( )                               (29)

In some embodiments, a MapReducer object may not be explicitly generated. In such a case, the unified MapReduce interface may generate and use a default MapReducer object.

In blocks 1506 and 1508, respectively, a mapper function and a reducer function is defined. The form of the mapper and the reducer functions may depend on the analysis to be performed on the input data. These forms, however, may not depend on the MapReduce environment.

In some embodiments a user defines a mapper function and a reducer function based on the specifics of the operation on the input data. Construct (30) shows exemplary prototypes of these functions according to some embodiments.

| Construct (30) |
|---|
| 1 function mapFcn (input data, interim outputs, ...)     3   (30)<br>2 function reduceFcn (interim outputs, outputs, ...) |

Line 1 of construct (30), shows a prototype of a mapper function. The mapper function receives an address of input data that mapper function uses as input, and an address of interim outputs, which the mapper function populates.

Line 2 of construct (30), on the other hand, shows a prototype of a reducer function. The reducer function receives an address of interim outputs that the reducer function uses as input, and an address of one or more outputs, which the reducer function populates.

In block 1510, the input data are processed through the MapReduce frame work using the MapReduce environment. Some embodiments utilize the unified MapReduce interface to perform the operations in block 1510. Construct (31) shows a syntax of calling the unified MapReduce interface according to some embodiments.

Construct (31)

mapreduce(input data,map$Fcn$,reduce$Fcn$,$mr$)           (31)

In construct (31), mapreduce is a function call to the unified MapReduce interface. The mapreduce call may receive one or more parameters and perform a MapReduce operation. In the syntax shown in construct (31), the mapreduce interface receives four parameters, an input data, a mapper function, a reducer function, and a MapReducer. The input data is a link to the data to be processed. In some embodiments, this argument is a link to a datastore object that interfaces the input data. The mapper function and reducer function need to be defined and passed to the unified MapReduce interface. The MapReducer is a link to a MapReducer object. In some embodiments, the unified MapReduce interface receives one or more of the input parameters through an application programming interface (API).

Some embodiments enable a program to avoid passing one or more of the parameters to the unified MapReduce call in construct (31). Doing so will result the unified MapReduce interface to receive a default value or a preset value for the missing argument. In various embodiments, the default input data may be a datastore previously defined in the program. Similarly, the system may use a pre-defined mapper function or reducer function as default functions.

In some embodiments, the unified MapReduce interface is called without receiving a MapReducer object. Construct (31.1) depicts a function call in one such embodiment.

Construct (31.1)

mapreduce(input data,map$Fcn$,reduce$Fcn$)           (31.1)

In construct (31), the mapreduce function call does not receive a link to a MapReducer Object. In such a case, for the MapReducer object, the system may use a default MapReducer object or a global current MapReducer object.

In some embodiments, the unified MapReducer interface utilizes one or more datastores. Construct (32) shows a syntax for such a unified MapReduce interface according to some embodiments.

Construct (32)

out$ds$=mapreduce(in$ds$,map$Fcn$,reduce$Fcn$,$mr$)           (32)

In construct (32), the mapreduce function may receive, for the input data argument, a datastore inds that interfaces with the input data. Further, in the syntax shown in construct (32), the mapreducer function returns a link to a datastore object outds. Outds may interface some data the results from the MapReduce operations.

In some embodiments, one or more of the input data, the interim outputs, and the outputs may not fit in the memory of one or more processors. In some of such embodiments, these data are instead stored into one or more storage devices and are accessed in chunks. In some embodiments, accessing the chunks is implemented by using datastores.

The unified MapReduce interface may enable a user to execute a MapReduce operation in a first environment and then migrate that operation to a second environment. For the first execution, for example, the user may use a local machine to process a sample small size data. Doing so may allow the user to debug different parts of the system, such as the mapper and the reducer functions. Once the debugging is complete, the user may then apply the system to a large amount of data in a more powerful environment, such as a multi-processor environment with parallel processing. The unified MapReduce interface enables such migration from the first environment to the second environment with minimal or no changes in the code.

Construct (33) illustrates an example of such a migration process using two different environments.

```
                        Construct (33)                    5   (33)
1 mr1= mapreducer (0)
2 mapreduce(input1, mapFcn, reduceFcn, mr1)
3 mr2= mapreducer(poolObject)
4 mapreduce(input2, mapFcn, reduceFcn, mr2)
```

Line 1 of construct (33) generates a serial MapReducer object mr1. Line 2 uses this MapReducer object to process the data input1 in the local serial environment. This first operation will use a MapReduce framework with the mapper and reducer functions addressed at mapFcn and reduceFcn. This operation may be used to debug some parts of the MapReduce system, e.g., the mapper and reducer functions.

Line 3, on the other hand, generates a parallel MapReducer mr2 using a parallel pool at address poolObject. Line 4 uses this second MapReducer object to process a second set of data, input2 in the parallel pool. This second operation will use the same, now debugged, mapper and reducer functions as in the first operation. Input1 may include some sample small size data, while input2 may include some large scale data that the user intends to process eventually.

Some embodiments enable chaining multiple MapReduce operations. When chaining such operations, the MapReduce operation may execute more than once. A program may utilize some chaining when, for example, the output of a single MapReduce operation does not satisfy one or more criteria, but repeating the operation on the results will bring the output within the requirements of the criteria. In some embodiments, when chained, a MapReduce operation processes an input data and delivers the output data as the input data to the next MapReduce operation in the chain.

Construct (34) illustrates an example of such a chaining process according to one embodiment.

```
                        Construct (34)                    6   (34)
1 metCriteria= false
2 while (~metCriteria)
3     someoutput=mapreduce(..., mr)
4     metCriteria=doSomeCheck(someoutput)
5 end
```

Line 1 of construct (34) defines a variable metCriteria that determines whether the processing of the input data has results that meet some criteria. In one embodiment, for example, the process may derive some outputs and the criteria may include whether the output has reached a certain amount of accuracy or has converged towards a desired limit. In another embodiment, for example, the process may compress the data in a file, and the criteria may include whether the file size has reduced below some threshold size. At line 1, the metCriteria variable is initialized to false. The value of metCriteria will change to true when the processed data meet the criteria.

Lines 2-5 define a loop in which the MapReduce chaining occurs. In particular, this loop repeats as long as the value of metCriteria is false. Line 3 applies a MapReduce operation using a MapReducer object mr. Among other things, this operation outputs a variable someoutput. At line 4, a function doSomeCheck( ) determines whether the criteria are met based on the value of someoutput, and accordingly sets the value of metCriteria to true or false. The process in lines 2-5 will repeat until the processed data meets the criteria. In some embodiments, an iteration modifies or provides some information or data that is used by the next iteration. For example, an iteration may result in some output data that is used as input data in the next iteration. In some cases the value of someoutput from an iteration is passed as one of the parameters to the next iteration.

In some embodiments, the unified MapReduce interface enables reusing the same code in different environments.

Construct (35) illustrates an example of such a reuse according to one embodiment.

```
                        Construct (35)                    6   (35)
1 mapreducer (...)
2 %myScript:
3 ....
4 mapreduce(inputdata,mapperF, reducerF)
5 ...
```

At line 1 of construct (35), the program generates a MapReducer object, which will be the current MapReducer object. The remainder of construct (35) include a script "myScript" that includes, at line 4, a MapReduce operation. The MapReduce operation processes some input data via a mapper function mapperF and a reducer function reducerF. The MapReduce operation at line 4 does not specify the MapReducer object and thus uses the current MapReducer object.

A program may thus reuse the code myScript in construct (35) in different MapReduce environments with no change to the code. The program only needs to define, outside the code such as shown at line 1, a MapReducer object that corresponds to the specific environment.

In some embodiments, one or more of the disclosed methods are stored in the form of programs or computer codes on one or more non-transitory computer-readable mediums. A computer readable medium can be a data storage module. A data storage module may comprise a random access memory (RAM), a read only memory (ROM), a programmable read-only memory (PROM), a field programmable read-only memory (FPROM), or other dynamic storage device for storing information and instructions to be used by another module, such as a data processing module or a search module. A data storage module may also include a database, one or more computer files in a directory structure, or any other appropriate data storage mechanism such as a memory.

The foregoing description of the embodiments has been presented for purposes of illustration only. It is not exhaustive and does not limit the embodiments to the precise form disclosed. Those skilled in the art will appreciate from the foregoing description that modifications and variations are possible in light of the above teachings or may be acquired from practicing the embodiments. For example, the steps described need not be performed in the same sequence discussed or with the same degree of separation. Likewise various steps may be omitted, repeated, combined, or performed in parallel, as necessary, to achieve the same or similar objectives. Similarly, the systems described need not necessarily include all parts described in the embodiments, and may also include other parts not described in the embodiments. Accordingly, the embodiments are not limited to the above-described details, but instead are defined by the appended claims in light of their full scope of equivalents.

The invention claimed is:

1. A method for interacting with a plurality of datasets, the method comprising:
providing a unified datastore to interact with the plurality of datasets, wherein:
the plurality of datasets have a plurality of different storage formats and are stored in a plurality of different storage environments;
each of the plurality of datasets includes input data having one of the plurality of different storage formats and being stored in one of the plurality of different storage environments; and
the unified datastore providing a single interface for an application through which the plurality of datasets are accessible for processing by the application using a single syntax;
calling a constructor method provided as part of the syntax for interacting with the plurality of datasets, wherein the constructor method is called with a location of a dataset of the plurality of datasets as an input to the constructor method;
in response to calling the constructor method, creating a datastore object for the dataset, comprising:
determining, based on the location of the dataset, a storage format of the dataset, a storage environment of the dataset, or both;
creating the datastore object, such that the datastore object is adapted to the storage format and the storage environment of the dataset, wherein:
the datastore object interfaces with input data of the dataset that has the storage format and is stored in the storage environment; and
the datastore object includes a first read method for reading a chunk from the dataset, wherein the first read method is adapted to the storage format and the storage environment of the dataset;
receiving, via a call of a read method provided as part of the single syntax for interacting with the plurality of datasets, a read command to read at least a portion of the dataset of the plurality of datasets; and
executing the first read method specified by the datastore object to read a chunk of the input data of the dataset.

2. The method of claim 1, further comprising receiving one or more parameters of at least one respective dataset of the plurality of datasets via the syntax, wherein the one or more parameters comprise one or more of:
information identifying a location of input data of the respective dataset;
a type of the input data of the respective dataset;
a format of the input data of the respective dataset;
an offset for reading from the input data of the respective dataset;
a size of a chunk to read from the input data;
a condition for determining the chunk; or
a query for deriving the input data of the respective dataset.

3. The method of claim 2, wherein the one or more parameters further comprise one or more additional parameters derived from the location of the input data, the one or more additional parameters comprising one or more of:
a type of the input data of the respective dataset; or
a format of the input data of the respective dataset.

4. The method of claim 1, wherein a size of the chunk read from the dataset is set by the datastore object.

5. The method of claim 1, wherein the datastore object further includes one or more of:

a reset method for resetting a state of the datastore object to an initial state where no data is read;
a preview method for reading a preview subset of the input data of the dataset;
a data method for determining whether all of the input data of the dataset has been read; or
a write data method to:
receive an additional data; and
add the additional data to the input data of the dataset.

6. The method of claim 1, wherein the input data has a type of a plurality of data types, and creating the datastore object further comprises determining a type of the datastore object based on the type of data type for the dataset.

7. The method of claim 6, wherein the plurality of data types include one or more of:
a tabular text file;
an SQL file;
an image file; or
a key-value pair formatted file.

8. The method of claim 1, wherein the input data of the dataset includes a plurality of files.

9. The method of claim 8, wherein the location of the input data of the dataset includes an address of the plurality of files.

10. The method of claim 1, wherein the datastore object further includes a split method for splitting the input data of the dataset into a plurality of split sections.

11. The method of claim 10, wherein the datastore object distributes the plurality of split sections among a plurality of multi-processing nodes.

12. The method of claim 1, wherein the datastore object is used as an input to a MapReduce interface for processing the input data of the dataset associated with the datastore object.

13. The method of claim 1, wherein creating the datastore object comprises generating the datastore object through a MapReduce system.

14. The method of claim 1, wherein:
the size of the chunk is set based on a type of the input data of the dataset.

15. The method of claim 1, where the size of the chunk is set based on a memory size assigned to one or more processors configured to process the input data of the respective data set.

16. The method of claim 1, further comprising determining, based on the location of the dataset, both the storage format and the storage environment of the dataset.

17. A non-transitory computer-readable medium storing a computer code, wherein the computer code, when executed by one or more processors, causes the one or more processors to:
provide a unified datastore to interact with a plurality of datasets, wherein:
the plurality of datasets have a plurality of different storage formats and are stored in a plurality of different storage environments;
each of the plurality of datasets includes input data having one of the plurality of different storage formats and being stored in one of the plurality of different storage environments; and
the unified datastore providing a single interface for an application through which the plurality of datasets are accessible for processing by the application using a single syntax;
call a constructor method provided as part of the syntax for interacting, using the unified datastore, with the plurality of datasets, wherein the constructor method is called with a location of a dataset of the plurality of datasets as an input to the constructor method;

in response to calling the constructor method, create a datastore object for the dataset, comprising:

determining, based on the location of the dataset, a storage format of the dataset, a storage environment of the dataset, or both;

creating the datastore object, such that the datastore object is adapted to the storage format and the storage environment of the dataset, wherein:

the datastore object interfaces with input data of the dataset that has the storage format and is stored in the storage environment; and the datastore object includes a first read method for reading a chunk from the dataset, wherein the first read method is adapted to the storage format and the storage environment of the dataset;

receive, via a call of a read method provided as part of the single syntax for interacting with the plurality of datasets, a read command to read at least a portion of the dataset of the plurality of datasets; and execute the first read method specified by the datastore object to read a chunk of the input data of the dataset.

18. The non-transitory computer-readable medium of claim 17, further comprising receiving one or more parameters of at least one dataset of the plurality of datasets via the syntax, wherein the one or more parameters further comprise one or more of:

information identifying a location of input data of the respective dataset;

a type of the input data of the respective dataset;

a format of the input data of the respective dataset;

an offset for reading from the input data of the respective dataset;

a size of a chunk to read from the input data;

a condition for determining the chunk; or a query for deriving the input data of the respective dataset.

19. A system for interacting with a plurality of datasets, the system comprising:

one or more storage devices; and one or more processors configured to:

provide a unified datastore to interact with the plurality of datasets, wherein:

the plurality of datasets have a plurality of different storage formats and are stored in a plurality of different storage environments;

each of the plurality of datasets includes input data having one of the plurality of different storage formats and being stored in one of the plurality of different storage environments;

the unified datastore providing a single interface for an application through which the plurality of datasets are accessible for processing by the application using a single syntax;

call a constructor method provided as part of the syntax for interacting, using the unified datastore, with the plurality of datasets, wherein the constructor method is called with a location of a dataset of the plurality of datasets as an input to the constructor method;

in response to calling the constructor method, create a datastore object for the dataset, comprising:

determining, based on the location of the dataset, a storage format of the dataset, a storage environment of the dataset, or both;

creating the datastore object, such that the datastore object is adapted to the storage format and the storage environment of the dataset, wherein:

the datastore object interfaces with input data of the dataset that has the storage format and is stored in the storage environment; and the datastore object includes a first read method for reading a chunk from the dataset, wherein the first read method is adapted to the storage format and the storage environment of the dataset;

receiving, via a call of a read method provided as part of the single syntax for interacting with the plurality of datasets, a read command to read at least a portion of the dataset of the plurality of datasets; and executing the first read method specified by the datastore object to read a chunk of the input data of the dataset.

20. The system of claim 19, further comprising receiving one or more parameters of at least one respective dataset of the plurality of datasets via the syntax, wherein:

the one or more parameters comprise information identifying a location of input data of the respective dataset; and the one or more parameters further comprise one or more additional parameters derived from the location of the input data of the respective dataset, the one or more additional parameters comprising one or more of:

a type of the input data of the respective dataset; or a format of the input data of the respective dataset.

21. The system of claim 19, wherein the size of the chunk is set by the respective datastore object.

* * * * *

UNITED STATES PATENT AND TRADEMARK OFFICE
CERTIFICATE OF CORRECTION

PATENT NO. : 11,169,993 B2  
APPLICATION NO. : 14/458895  
DATED : November 9, 2021  
INVENTOR(S) : Penelope Anderson et al.

Page 1 of 1

It is certified that error appears in the above-identified patent and that said Letters Patent is hereby corrected as shown below:

In the Claims

Column 36, Claim 6, Line 13, "for the dataset" should read --for the respective dataset--.

Column 37, Claim 18, Lines 26-27, "at least one dataset of the plurality of datasets via the syntax, wherein the one or more parameters further comprise" should read --at least one respective dataset of the plurality of datasets via the syntax, wherein the one or more parameters comprise--.

Column 38, Claim 21, Line 48, "is set by the respective datastore object" should read --is set by the datastore object--.

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*